US012778008B2

(12) United States Patent
O'Connor et al.

(10) Patent No.: US 12,778,008 B2
(45) Date of Patent: Nov. 3, 2026

(54) AUTOMATIC UNLOADING SYSTEM SHUTOFF FOR AN UNLOADING OPERATION

(71) Applicant: Deere & Company, Moline, IL (US)

(72) Inventors: Kellen E. O'Connor, Clive, IA (US); Jeremy J. Faust, Grimes, IA (US); Sara C. O'Connor, Clive, IA (US); Ryan R. White, Polk City, IA (US)

(73) Assignee: Deere & Company, Moline, IL (US)

( * ) Notice: Subject to any disclaimer, the term of this patent is extended or adjusted under 35 U.S.C. 154(b) by 173 days.

(21) Appl. No.: 18/471,701

(22) Filed: Sep. 21, 2023

(65) Prior Publication Data

US 2024/0138299 A1 May 2, 2024

Related U.S. Application Data

(60) Provisional application No. 63/512,368, filed on Jul. 7, 2023, provisional application No. 63/381,178, filed on Oct. 27, 2022, provisional application No. 63/381,187, filed on Oct. 27, 2022.

(51) Int. Cl.

*A01D 41/127* (2006.01)
*A01D 41/12* (2006.01)
*A01D 90/02* (2006.01)

(52) U.S. Cl.

CPC ..... *A01D 41/1275* (2013.01); *A01D 41/1208* (2013.01); *A01D 90/02* (2013.01)

(58) Field of Classification Search

CPC ............ A01D 41/1275; A01D 41/1208; A01D 41/1217; A01D 90/02; A01D 43/08; A01D 43/07

See application file for complete search history.

(56) References Cited

U.S. PATENT DOCUMENTS

| | | | |
|---|---|---|---|
| 8,032,255 | B2 | 10/2011 | Phelan et al. |
| 8,060,283 | B2 | 11/2011 | Molt et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,868,304 | B2 | 10/2014 | Bonefas |
| 9,043,096 | B2 | 5/2015 | Zielke et al. |
| 9,049,817 | B2 | 6/2015 | McCully et al. |
| 9,119,342 | B2 | 9/2015 | Bonefas |
| 9,169,032 | B2 | 10/2015 | Gengerke |

(Continued)

FOREIGN PATENT DOCUMENTS

| | | | |
|---|---|---|---|
| CA | 2791436 | A1 | 4/2014 |
| CN | 108550141 | A | 9/2018 |

(Continued)

OTHER PUBLICATIONS

Translation of DE 102015109799 A1 (Year: 2016).*

(Continued)

*Primary Examiner* — Russell Frejd
(74) *Attorney, Agent, or Firm* — Christopher J. Volkmann; Kelly, Holt & Christenson PLLC

(57) ABSTRACT

A leading vehicle loads material into a receiving vehicle during an unloading operation. An unloading control system detects and processes stop conditions to automatically stop a material conveyance mechanism when a stop condition arises.

19 Claims, 15 Drawing Sheets

(56) References Cited

U.S. PATENT DOCUMENTS

| | | | | |
|---|---|---|---|---|
| 9,185,845 | B2 | 11/2015 | Van Mill et al. | |
| 9,187,259 | B2 | 11/2015 | Van Mill et al. | |
| 9,272,853 | B2 | 3/2016 | Van Mill et al. | |
| 9,326,444 | B2 | 5/2016 | Bonelas | |
| 9,392,746 | B2 | 7/2016 | Darr et al. | |
| 9,457,971 | B2 | 10/2016 | Bonefas et al. | |
| 9,529,364 | B2 | 12/2016 | Foster et al. | |
| 9,545,048 | B2 | 1/2017 | Pickett et al. | |
| 9,596,805 | B2 | 3/2017 | Van Mill et al. | |
| 9,596,809 | B2 | 3/2017 | Van Mill et al. | |
| 9,615,509 | B2 | 4/2017 | Flickinger et al. | |
| 9,642,305 | B2 | 5/2017 | Nykamp et al. | |
| 9,763,389 | B2 | 9/2017 | Bump et al. | |
| 9,820,436 | B2 | 11/2017 | Inoue et al. | |
| 9,861,040 | B2 | 1/2018 | Bonefas | |
| 9,873,570 | B2 | 1/2018 | Van Mill et al. | |
| 9,992,931 | B2 | 6/2018 | Bonefas et al. | |
| 10,019,790 | B2 | 7/2018 | Bonefas et al. | |
| 10,028,434 | B2 | 7/2018 | Van Mill et al. | |
| 10,028,441 | B2 | 7/2018 | Van Mill et al. | |
| 10,028,442 | B1 | 7/2018 | Crosby | |
| 10,106,333 | B2 | 10/2018 | Beaujot et al. | |
| 10,278,328 | B2 | 5/2019 | Thomson et al. | |
| 10,292,327 | B2 | 5/2019 | Ducroquet et al. | |
| 10,351,364 | B2 | 7/2019 | Green et al. | |
| 10,406,961 | B2 | 9/2019 | Grodecki et al. | |
| 10,760,946 | B2 | 9/2020 | Meier et al. | |
| 10,765,063 | B2 | 9/2020 | Van Mill et al. | |
| 10,807,812 | B2 | 10/2020 | Thomson et al. | |
| 11,008,177 | B2 | 5/2021 | Banthia et al. | |
| 11,390,263 | B2 | 7/2022 | O'Connor et al. | |
| 11,457,562 | B2 | 10/2022 | Van Mill et al. | |
| 11,825,765 | B2 | 11/2023 | Van Mill et al. | |
| 11,957,078 | B1 | 4/2024 | Herichkoff | |
| 2006/0046800 | A1* | 3/2006 | Kaltenheuser | A01D 41/12 460/6 |
| 2009/0321154 | A1 | 12/2009 | Johnson | |
| 2011/0066337 | A1 | 3/2011 | Kormann | |
| 2011/0220677 | A1 | 9/2011 | Bertolani | |
| 2012/0215394 | A1 | 8/2012 | Wang et al. | |
| 2013/0211658 | A1 | 8/2013 | Bonefas | |
| 2014/0224377 | A1 | 8/2014 | Bonefas | |
| 2014/0311113 | A1 | 10/2014 | Bonefas | |
| 2015/0023775 | A1 | 1/2015 | Bonefas et al. | |
| 2015/0149048 | A1 | 5/2015 | Menke et al. | |
| 2015/0264866 | A1* | 9/2015 | Foster | B65G 67/04 414/21 |
| 2017/0042088 | A1 | 2/2017 | Nykamp et al. | |
| 2017/0055446 | A1 | 3/2017 | Nykamp et al. | |
| 2018/0037424 | A1* | 2/2018 | Green | G05D 1/0293 |
| 2018/0042179 | A1 | 2/2018 | Bonefas | |
| 2019/0124848 | A1 | 5/2019 | Johnson et al. | |
| 2019/0277687 | A1* | 9/2019 | Blank | B60W 30/18 |
| 2020/0039306 | A1 | 2/2020 | Rogan | |
| 2020/0133262 | A1 | 4/2020 | Suleman et al. | |
| 2020/0149949 | A1* | 5/2020 | Meier | G01G 19/00 |
| 2020/0238882 | A1* | 7/2020 | Grieshop | B60P 1/42 |
| 2020/0319655 | A1 | 10/2020 | Desai et al. | |
| 2021/0195840 | A1 | 7/2021 | Puryk et al. | |
| 2021/0294337 | A1 | 9/2021 | Van Mill et al. | |
| 2021/0329840 | A1 | 10/2021 | Craig | |
| 2021/0337729 | A1 | 11/2021 | O'Connor et al. | |
| 2022/0015288 | A1 | 1/2022 | Christiansen et al. | |
| 2022/0015290 | A1 | 1/2022 | Yao et al. | |
| 2022/0019239 | A1 | 1/2022 | Christiansen et al. | |
| 2022/0071078 | A1 | 3/2022 | Boyer et al. | |
| 2022/0287239 | A1 | 9/2022 | Faust et al. | |
| 2022/0408641 | A1 | 12/2022 | Van Mill et al. | |
| 2022/0408645 | A1 | 12/2022 | O'Connor et al. | |
| 2022/0410704 | A1* | 12/2022 | O'Connor | A01D 43/073 |
| 2023/0031013 | A1 | 2/2023 | Faust et al. | |
| 2023/0115778 | A1* | 4/2023 | Kahlig | A01D 90/10 414/345 |
| 2024/0032474 | A1 | 2/2024 | Ritter et al. | |
| 2024/0103123 | A1* | 3/2024 | Meier | G01S 13/343 |
| 2024/0123892 | A1 | 4/2024 | Graff et al. | |
| 2024/0130294 | A1 | 4/2024 | Currie et al. | |
| 2024/0147901 | A1 | 5/2024 | Debbaut et al. | |

FOREIGN PATENT DOCUMENTS

| | | | |
|---|---|---|---|
| DE | 102005025318 | A1 | 12/2006 |
| DE | 102009027245 | | 12/2010 |
| DE | 102012211001 | A1 | 1/2014 |
| DE | 102015109799 | A1 | 12/2016 |
| DE | 102016214320 | A1 | 2/2017 |
| EP | 1219153 | A2 | 7/2002 |
| EP | 2044826 | A2 | 4/2009 |
| EP | 2245917 | A2 | 11/2010 |
| EP | 2995191 | A1 | 3/2016 |
| EP | 3316218 | A1 | 5/2018 |
| EP | 3473074 | A1 | 4/2019 |
| EP | 3815486 | A1 | 5/2021 |
| EP | 3949714 | A1 | 2/2022 |
| EP | 3955183 | A1 | 2/2022 |
| EP | 4056019 | A1 | 9/2022 |
| EP | 4062740 | A1 | 9/2022 |
| EP | 4070636 | A1 | 10/2022 |
| EP | 4101286 | A1 | 12/2022 |
| GB | 1104906 | A | 3/1968 |
| WO | 2018102524 | A1 | 6/2018 |
| WO | WO 2022036114 | A1 | 2/2022 |
| WO | WO 2022061447 | A1 | 3/2022 |
| WO | 2023150219 | A1 | 8/2023 |

OTHER PUBLICATIONS

John Deere, Active Fill Control Retrieved from internet on Jun. 27, 2023, 2 pages. <https://www.deere.com/en/technology-products/precision-ag-technology/guidance/active-fill-control/>.

John Deere, Machine Sync Retrieved from internet: Jun. 27, 2023, 3 pages. <https://www.deere.com/en/technology-products/precision-ag-technology/guidance/machine-sync/>.

Huang, Xiaoshui & Mei, Guofeng & Zhang, Jian & Abbas, Rana. (2021). A comprehensive survey on point cloud registration, Mar. 5, 2021, 17 pages. Retrieved from internet: <https://www.researchgate.net/publication/349787695_A_comprehensive_survey_on_point_cloud_registration>.

U.S. Appl. No. 18/352,576 Application and Drawings filed on Jul. 14, 2023, 39 pages.

U.S. Appl. No. 18/471,701 Application and Drawings filed on Sep. 21, 2023, 50 pages.

U.S. Appl. No. 18/447,718 Application and Drawings filed on Aug. 10, 2023, 53 pages.

U.S. Appl. No. 18/358,401 Application and Drawings filed on Jul. 25, 2023, 47 pages.

U.S. Appl. No. 18/465,580 Application and Drawings filed on Sep. 12. 2023, 114 pages.

U.S. Appl. No. 18/334,886 Application and Drawings filed on Jun. 14, 2023, 47 pages.

U.S. Appl. No. 18/334,863 Application and Drawings filed on Jun. 14, 2023, 73 pages.

U.S. Appl. No. 18/334,869 Application and Drawings filed on Jun. 14, 2023, 85 pages.

U.S. Appl. No. 18/334,861 Application and Drawings filed on Jun. 14, 2023, 96 pages.

U.S. Appl. No. 18/334,874 Application and Drawings filed on Jun. 14, 2023, 59 pages.

Extended European Search Report and Written Opinion issued in European Patent Application No. 24180988.8 dated Nov. 19, 2024, in 08 pages.

Extended European Search Report and Written Opinion issued in European Patent Application No. 23203067.6 dated Aug. 6, 2024, in 11 pages.

Extended European Search Report and Written Opinion issued in European Patent Application No. 23202822.5, dated Mar. 19, 2024, in 07 pages.

Extended European Search Report and Written Opinion issued in European Patent Application No. 23203069.2, dated Mar. 18, 2024, in 07 pages.

(56) References Cited

OTHER PUBLICATIONS

Extended European Search Report and Written Opinion issued in European Patent Application No. 23203519.6, dated Mar. 14, 2024, in 05 pages.
Extended European Search Report and Written Opinion issued in European Patent Application No. 23203536.0, dated Mar. 14, 2024, in 06 pages.
Extended European Search Report and Written Opinion issued in European Patent Application No. 23203537.8, dated Mar. 14, 2024, in 05 pages.
Extended European Search Report and Written Opinion issued in European Patent Application No. 23202466.1, dated Mar. 26, 2024, in 07 pages.
Extended European Search Report and Written Opinion issued in European Patent Application No. 23202485.1, dated Mar. 26, 2024, in 07 pages.
Extended European Search Report and Written Opinion issued in European Patent Application No. 23203067.6, dated Mar. 26, 2024, in 11 pages.
Extended European Search Report and Written Opinion issued in European Patent Application No. 23202510.6, dated Apr. 4, 2024, in 08 pages.
Extended European Search Report and Written Opinion issued in European Patent Application No. 23202817.5, dated Apr. 23, 2024, in 08 pages.
Determine Volume of Solid, Oct. 16, 2019, 3 pages, https://knowledge.autodesk.com/support/autocad/learn-explore/caas/sfdcarticles/sfdcarticles/Determine-volume-of-solid.html#:~:text=To%20determine%the%20volume%20of%20a%20solid%20object%20C%20use%20the,Press%20ENTER.
SolidWorks Calculating vol. of a Solid, Feb. 3, 2022, 6 pages. https://www.goengineer.com/blog/solidworks-calculating-volume-of-a-solid.
U.S. Appl. No. 63/361,178 Application and Drawings filed on Oct. 27, 2022, 101 pages.
U.S. Appl. No. 63/381,187 Application and Drawings filed on Oct. 27. 2022, 104 pages.
U.S. Appl. No. 63/512,366 Application and Drawings filed on Jul. 7, 2023, 101 pages.
https://teslamotorsclub.com/tmc/threads/lane-change-notification.252072/, dated Dec. 29, 2021, 4 pages.
Killbros: "1950 Dual-Auger Grain Cart," Killbros Farm Equipment, 2016, 8 Pages, Retrieved from URL: https://web.archive.org/web/20160203214035/https://www.killbrosequip.com/grain-carts/1950.
Search Report for German Application No. 102023132671.6, dated Jul. 4, 2024, 10 Pages.
Tumenjargal E., et al., "Development of ISO 11783 Compliant Agricultural Systems: Experience Report," Automotive Systems and Software Engineering, 2019, pp. 197-223.

* cited by examiner

AUTOMATIC UNLOADING SYSTEM SHUTOFF FOR AN UNLOADING OPERATION

CROSS-REFERENCE TO RELATED APPLICATION

The present application is based on and claims the benefit of U.S. provisional patent application Ser. No. 63/512,368, filed Jul. 7, 2023, U.S. provisional patent application Ser. No. 63/381,178, filed Oct. 27, 2022, U.S. provisional patent application Ser. No. 63/381,187, filed Oct. 27, 2022, the content of which is hereby incorporated by reference in its entirety.

FIELD OF THE DESCRIPTION

The present description generally relates to machines that load material into receiving vehicles, such as harvesting machines that fill carts, semitrailers, or other agricultural receiving vehicles. More specifically, but not by limitation, the present description relates to automated unloading system shutoff during the unloading operation.

BACKGROUND

There are a wide variety of different types of vehicles that load material into other vehicles. Some such vehicles include agricultural vehicles such as forage harvesters or other harvesters (such as combine harvesters, sugarcane harvesters, silage harvesters, etc.), that harvest grain or other crop. Such harvesters often unload material into carts, which may be pulled by tractors, or semitrailers, as the harvesters are moving. Other vehicles that unload material into receiving vehicles include construction vehicles, such as cold planers that unload material into a dump truck, and other vehicles.

Taking an agricultural harvester as an example, while harvesting in a field using a forage harvester or combine harvester, an operator attempts to control the harvester to maintain harvesting efficiency, during many different types of conditions. The soil conditions, crop conditions, etc. can all change. This may result in the operator changing control settings. This means the operator needs to devote a relatively large amount of attention to controlling the forage harvester or combine harvester.

At the same time, a semitruck or tractor-pulled cart (a receiving vehicle), is often in position relative to the harvester (e.g., alongside the harvester or behind the harvester) so that the harvester can fill the semitrailer or cart, while moving through the field. In some current systems, this requires the operator of the harvester to control the position of the unloading spout and/or flap so that the receiving vehicle is filled evenly, but not over filled. Even a momentary misalignment between the spout and the receiving vehicle may result in hundreds of pounds of harvested material being dumped on the ground, rather than in the receiving vehicle.

The discussion above is merely provided for general background information and is not intended to be used as an aid in determining the scope of the claimed subject matter.

SUMMARY

A leading vehicle loads material into a receiving vehicle during an unloading operation. An unloading control system detects and processes stop conditions to automatically stop a material conveyance mechanism when a stop condition arises.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
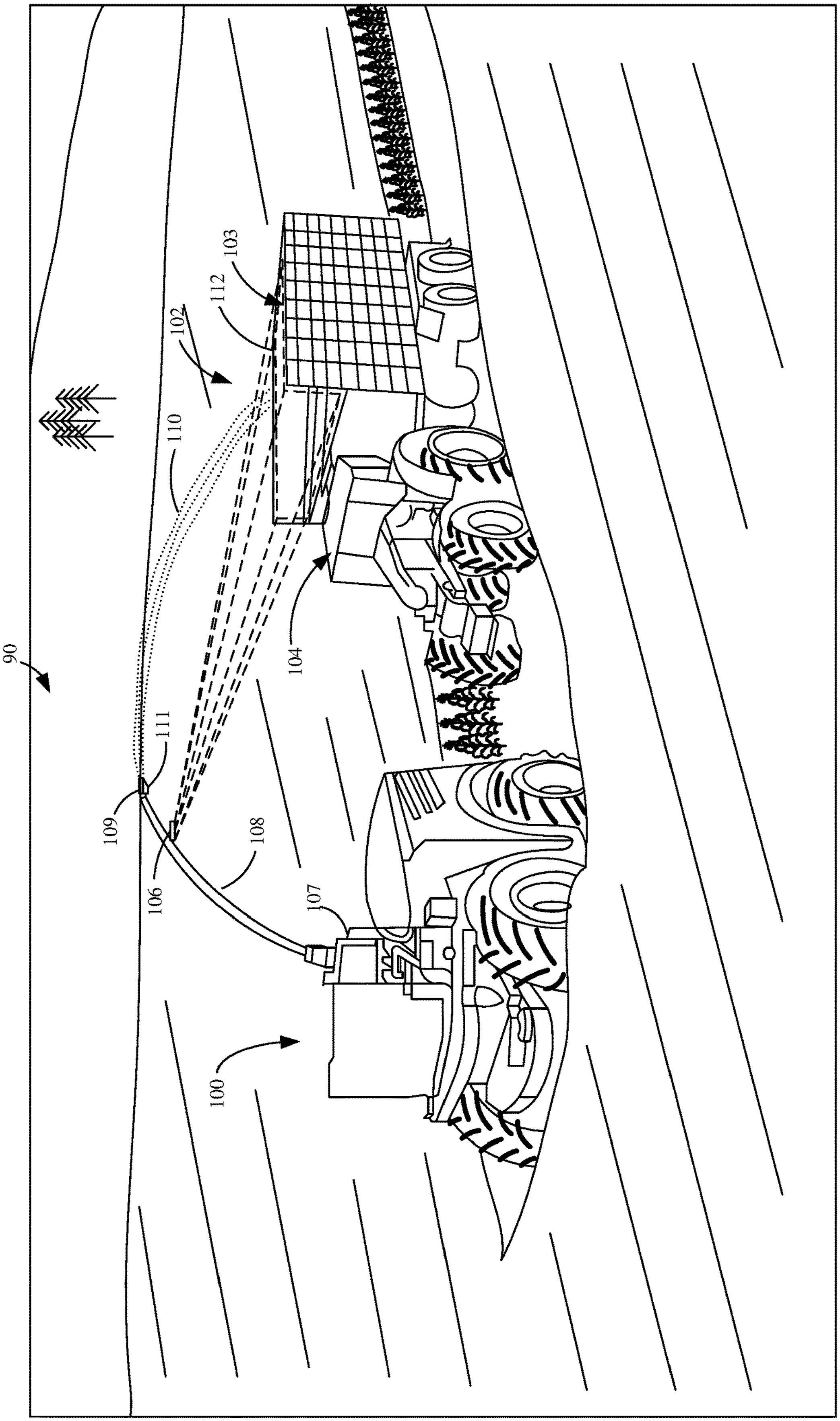
FIG. 1 is a pictorial illustration of one example of a forage harvester filling a tractor-pulled receiving vehicle, with the receiving vehicle following the forage harvester.

The present discussion proceeds with respect to an agricultural harvester, but it will be appreciated that the present discussion is also applicable to construction machines or other material loading vehicles as well. As discussed above, it can be very difficult for an operator to maintain high efficiency in controlling a harvester, and also to optimally monitor the position of the receiving vehicle during an unloading (or filling) operation. This difficulty can even be exacerbated when the receiving vehicle is located behind the harvester (such as a forage harvester), so that the forage harvester is executing a rear unloading operation, but the difficulty also exists in side-by-side unloading scenarios.

For instance, it can be very difficult for an operator of a leading vehicle to determine when to shut off the material conveyance system to stop the unloading operation. Conditions for stopping the unloading operation can arise quickly, and conditions can be difficult to identify.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of crop deposited inside the receiving vehicle. The system also detects material height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways, but often do not avoid cross members.

In addition, some current harvesters are provided with a machine synchronization control system. The harvester may be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward or rearward, respectively, relative to the combine harvester.

In all of the systems that attempt to automate part or all of the unloading process from a harvester into a receiving vehicle, the automated system attempts to understand where the receiving vehicle is located relative to the leading vehicle or relative to the material conveyance subsystem on the leading vehicle (e.g., relative to the spout on the harvester or the vehicle that is controlling the following vehicle). For purposes of the present discussion, the term leading vehicle will be the vehicle that is unloading material into the receiving vehicle. The term following vehicle will refer to the propulsion vehicle, or towing vehicle (such as a tractor), that is providing propulsion to the receiving vehicle (such as a cart).

Determining the location of the receiving vehicle over time can be accomplished using different types of systems. In some current systems, a camera and image processor are used to capture an image (static or video) of parts of the receiving vehicle (the edges of the receiving area of the cart, the walls of the cart, the front end and rear end of the cart, the hoops or cross members on the receiving vehicle, etc., collectively referred to herein as receiving vehicle parameters) and an image processor processes that image in attempt to identify the receiving vehicle parameters, in real-time, during the harvesting operation. The image processor identifies the receiving vehicle parameters in the image and a controller then attempts to identify the location of the receiving vehicle parameters relative to the leading vehicle (e.g., relative to spout on the harvester), in real-time, during harvesting and unloading.

The image processor can also be used to determine the fill level of material at the current material landing point in the receiving vehicle. The fill level can also be based on the volume of material and/or the weight of material at the current landing point.

Even using such automated systems, the operator of the leading vehicle often attempts to determine when to issue nudge commands or to otherwise change the material landing point of the material in the receiving vehicle. For instance, the operator of the leading vehicle often attempts to monitor the level of material in the receiving vehicle and to determine when the landing point of material in the receiving vehicle should be changed. The operator of the leading vehicle then provides an input so that a "nudge" is issued, or so that the spout or flap is repositioned to change the landing point of the material, or to stop the material conveyance subsystem (e.g., the auger on the leading vehicle) once the receiving vehicle is full. There may be several conditions that arise and indicate that the unloading operation should be stopped. However, it can be difficult for the operator of the leading vehicle to detect such conditions and to determine when to shut off the material conveyance system.

For instance, it can be difficult for the operator to continuously monitor the fill level of material in the receiving vehicle to stop the unloading operation when the receiving vehicle is full, or when a fill pattern has been fully executed.

Further, it can be difficult for the operator of the leading vehicle to tell when a spill is imminent. As one example, the leading vehicle or the following vehicle may accelerate or decelerate or stop suddenly. This quickly changes the position of the receiving vehicle relative to the position of the leading vehicle. If the material landing point is near the front or rear end of the receiving vehicle, then the following vehicle may not be able to respond quickly enough to avoid a spill. For instance, assume that the leading vehicle accelerates quickly and the material landing point is near the front edge of the receiving vehicle. Then, upon sudden acceleration of the leading vehicle, the following vehicle (e.g., the tractor pulling the cart) may not have sufficient power to accelerate quickly enough to avoid a spill (e.g., to avoid the spout on the leading vehicle moving forward of the front edge of the receiving vehicle and therefore spilling material onto the ground).

Also, under certain conditions, it can be difficult for the operator to even see that a spill is already occurring. This may occur when the operator is occupied performing another task, for instance.

Also, it can be difficult for an operator to tell when the hopper on the leading vehicle (e.g., the clean grain tank on a harvester) is empty. By way of example, when an unloading operation is initiated and the clean grain tank is full, the unloading auger may move a relatively high volume of material from the clean grain tank to the receiving vehicle. Thus, the column of material exiting the spout and entering the receiving vehicle may be large. However, when the clean grain tank is empty, then harvested material will only be entering the clean grain tank at the rate at which it is harvested. Thus, the unloading auger can only unload the harvested material, at that same rate, to the receiving vehicle. Thus, while harvested material will still be coming out of the spout, the size of the column of that material will be much smaller than when the clean grain tank is full. However, it can be difficult for the operator of the leading vehicle to detect this change in column size (or change in mass flow) of material from the leading vehicle to the receiving vehicle.

The present description thus describes a system in which a stop condition processing system detects and processes various stop conditions and automatically generates control signals to stop the material conveyance subsystem on the leading vehicle, to thus stop the unloading operation. By automatic it is meant, in one example, that the function or operation is performed without further human involvement except, perhaps, to initiate or authorize the function or operation. A fill strategy processor detects when a fill strategy (e.g., a front-to-back or back-to-front or multi-pass fill strategy) has been completed. The fill strategy processor can also detect when the fill level in the receiving vehicle is at desired fill level. In either case, the fill strategy processor can generate an output that can generate control signals to automatically stop unloading material into the receiving vehicle. A spill condition processor receives inputs indicative of whether a spill is actually occurring or whether a spill is imminent. In either case, the spill condition processor generates an output to stop the material conveyance subsystem to thus stop the unloading operation. Further, in one example, an unloading condition processor detects when the hopper on the leading vehicle (e.g., the clean grain tank on a harvester) has been unloaded and generates an output so that the unloading operation can be automatically stopped.

FIG. 1 is a pictorial illustration showing one example of a self-propelled forage harvester 100 (a material loading vehicle also referred to as a leading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a tractor 104 (a towing vehicle also referred to as a following vehicle), that is pulling grain cart 102, is positioned directly behind forage harvester 100 Also, in the example illustrated in FIG. 1, forage harvester 100 has a detector such as camera 106 mounted on the spout 108 through which the harvested material 110 is traveling. The spout 108 can be pivotally or rotatably mounted to a frame 107 of harvester 100. In the example shown in FIG. 1, the detector 106 is a stereo-camera or a mono-camera that captures an image (e.g., a still image or video) of the receiving area 112 of cart 102. Also, in the example shown in FIG. 1, the receiving area 112 is defined by an upper edge of the walls of cart 102.

When harvester 100 has an automatic fill control system (or unloading control system) that includes image processing, as discussed above, the automatic fill control system attempts to identify the location of the receiving area 112 by identifying the edges or walls of the receiving area and can then gauge the height of harvested material in cart 102, and the location of that material in the receiving vehicle. The system thus automatically controls the position of spout and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103 of receiving vehicle 102. Then, once a desired fill level is reached in the back of vessel 103, the automatic fill control system moves the spout and flap so the material begins landing just forward of the first landing point in vessel 103.

Figure 2:
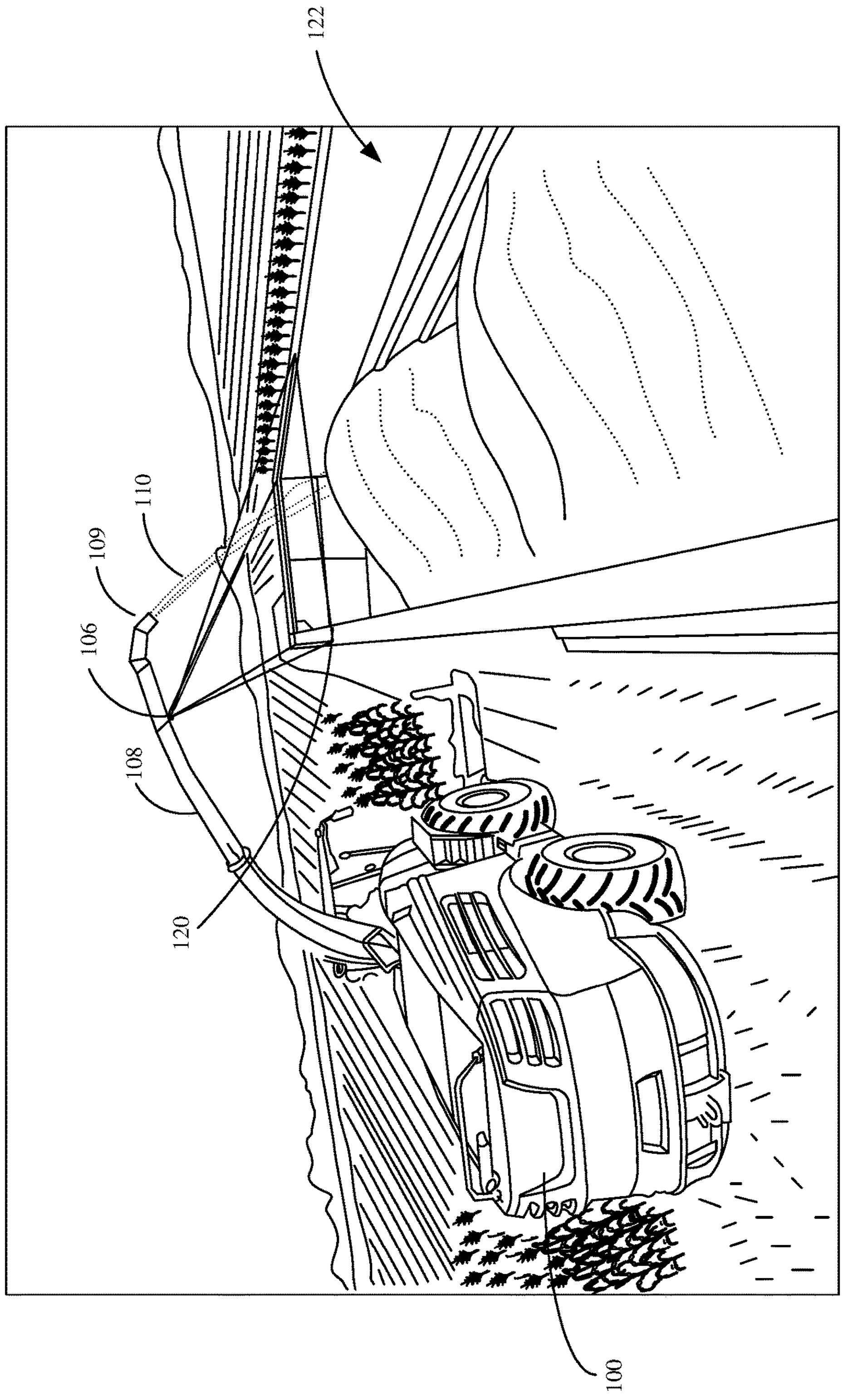
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (also referred to as a following vehicle) is pulling semi-trailer alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point and fill level for the harvested material in trailer 122.

Figure 3:
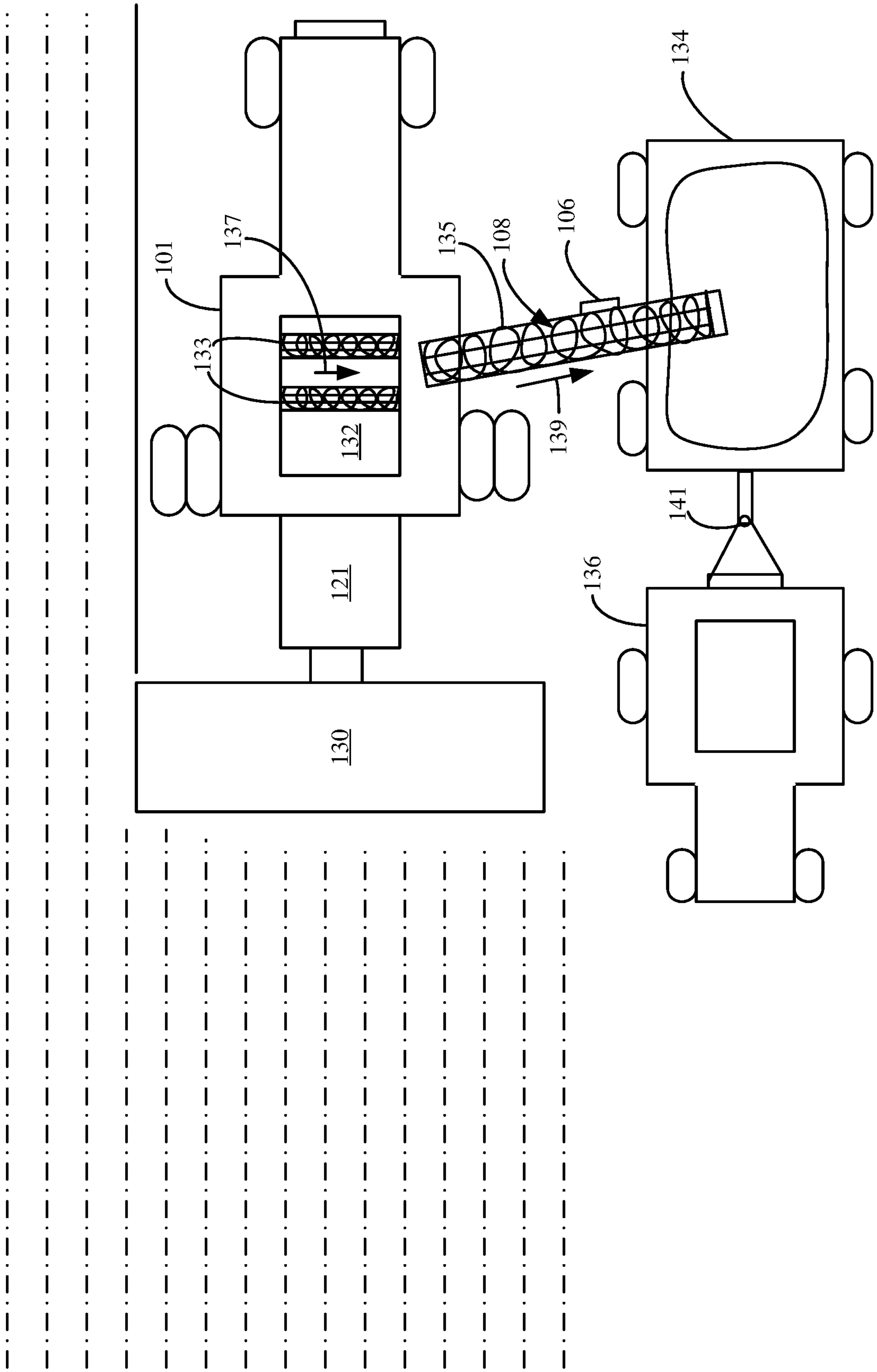
FIG. 3 shows a combine harvester filling a receiving vehicle.

FIG. 3 shows an example in which leading vehicle 101 is a combine harvester, with an operator's compartment 121 and with a header 130 that engages crop. The crop is processed and placed in a clean grain tank 132. In the example shown in FIG. 3, clean grain tank 132 has one or more cross augers 133 that move the grain toward an unloading auger 135 in spout 108, generally in the direction indicated by arrow 137. The material is unloaded (such as using auger in the direction indicated by arrow 139) through spout 108 into a receiving vehicle 134 (e.g., a grain cart) that is pulled by a following vehicle 136 (e.g., a tractor). FIG. 3 shows that receiving vehicle 134 is coupled to following vehicle 136 at a hitch point, or pivot point, 141. When harvester is a combine harvester, it may be that the spout 108 is not moved relative to the frame of harvester 101 during normal unloading operations. Instead, the relative position of the receiving vehicle 134 and the combine harvester 101 is changed in order to fill the receiving vessel 134 as desired. Thus, if a front-to-back fill strategy is to be employed, then the relative position of the receiving vessel in receiving vehicle 134, relative to the combine harvester 101, is changed so that the spout 108 is first filling the receiving vehicle 134 at the front end, and then gradually fills the receiving vessel moving rearward.

In the configuration shown in FIGS. 1, 2, and 3, spout 108 illustratively has a detector, such as a stereo camera, that again attempts to identify parameters of the receiving vehicle so that the receiving vehicle can be located and so that the unloading operation can be controlled to unload material at a desired location in the receiving vehicle to accomplish a desired fill strategy. Again, it can be difficult for the operator of leading vehicle 101 to know when to turn off the material conveyance subsystem (e.g., augers 133 and 135).

Thus, the present description proceeds with respect to a system that automatically detects stop conditions and generates control signals to stop the unloading operation.

Figure 4:
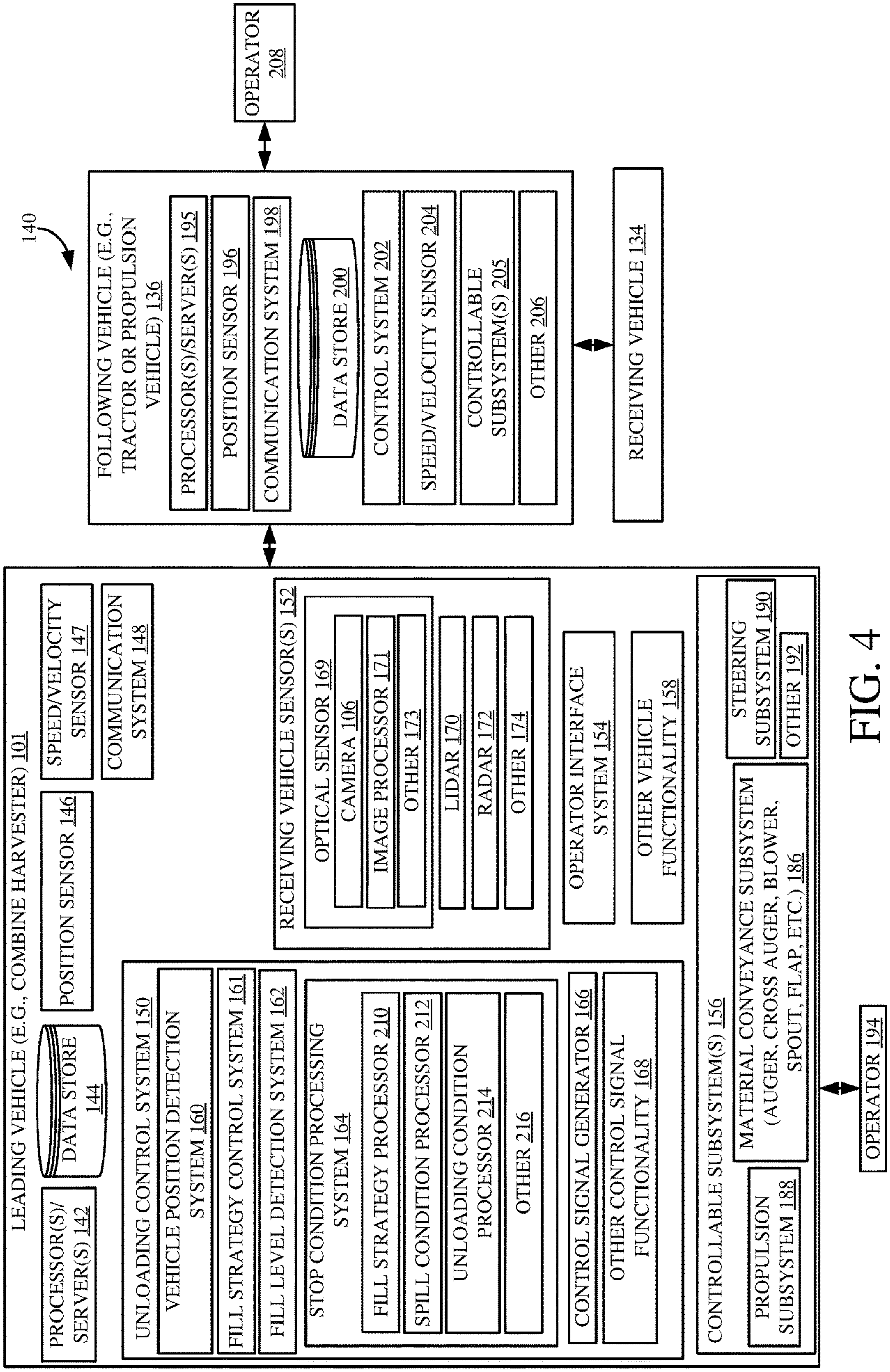
FIG. 4 is a block diagram of one example of an agricultural system.

FIG. 4 is a block diagram showing one example of an agricultural system 140 which includes leading vehicle (in the present example, a combine harvester) 101 which is followed by following vehicle (in the present example, a tractor or another propulsion vehicle) 136. Following vehicle 136 is pulling a receiving vehicle 134. It will be appreciated that while agricultural system shown in FIG. 4 includes leading vehicle 101, following vehicle 136, and receiving vehicle (e.g., the vehicles shown in the example illustrated in FIG. 3) other leading vehicles, following vehicles, and receiving vehicles can be used as well. The example shown in FIG. 4 is shown for the sake of example only.

Leading vehicle 101 includes one or more processors or servers 142, data store 144 position sensor 146, speed/velocity sensor 147, communication system 148, unloading control system 150, receiving vehicle sensors 152, operator interface system 154, controllable subsystems 156, and other vehicle functionality 158. Unloading control system 150 can include vehicle position detection system 160, fill strategy control system 161, fill level detection system 162, stop condition processing system 164, control signal generator 166, and other control system functionality 168. Stop condition processing system 164 can include fill strategy processor 210, spill condition processor 212, unloading condition processor 214, and other items 216. Receiving vehicle sensors 152 can include optical sensor 169, LIDAR sensor 170, RADAR sensor 172, and/or other sensors 174. Optical sensor 169 can include camera 106, image processor 171, and/or other items 173. Controllable subsystems 156 can include material conveyance subsystem (e.g., auger 135, cross auger(s) 133, blower, spout 108, flap 109, etc.) 186, propulsion subsystem 188, steering subsystem 190, and other items 192. FIG. 4 also shows that leading vehicle 101 can be operated by an operator 194.

Following vehicle 136 can include position sensor 196, communication system 198, one or more processors or servers 195, data store 200, control system 202, speed/velocity sensor 204, controllable subsystem(s) 205, and any of a wide variety other functionality 206. FIG. 4 also shows that following vehicle 136 is operated by operator 208. Before describing the overall operation of agricultural system 140 in more detail, a description of some of the items in system 140, and their operation, will first be provided.

Position sensor 146 can be a global navigation satellite system (GNSS) receiver, a dead reckoning system, a cellular triangulation system, or any of a wide variety of other systems that identify the coordinates or location of leading vehicle 101 in a global or local coordinate system. Data store 144 can store dimension information and orientation information, such as information that identifies the location and orientation of optical sensor 106 relative to the material conveyance system (e.g., blower, spout, flap, etc.) 186. Data store 144 can store other information as well.

Communication system 148 enables the communication of items on vehicle 101 with other items on vehicle 101, as well as communication with following vehicle 136 and other communication. Therefore, communication system 148 can be a controller area network (CAN) bus and bus controller, a cellular communication device, a Wi-Fi communication device, a local or wide area network communication device, a Bluetooth communication device, and/or any of a wide variety of devices or systems that enable communication over different types of networks or combinations of networks.

Receiving vehicle sensors 152 sense the receiving vehicle 134 and/or parameters of receiving vehicle 134. In the example discussed herein, the parameters of receiving vehicle 134 can be structural portions of receiving vehicle 134 that allow the location of the receiving area of receiving vehicle 134 to be determined. The receiving vehicle parameters, for example, may be the front wall or top front edge of the receiving vehicle 134, the side walls or top side edges of receiving vehicle 134, the rear wall or the top rear edge of receiving vehicle 134, etc. Therefore, optical sensor 169 can include camera 106 and image processor 171. During a calibration process or during runtime or at another time, camera 106 can capture an image (static or video) of receiving vehicle 134 and image processor 171 can identify the location of the receiving vehicle parameters within that image. Thus, image processor 171 can identify the location of the front wall or front edge of receiving vehicle 134 within the captured image, and/or the other receiving vehicle parameters. In other examples, RADAR sensor 170 and/or LIDAR sensor 172 can be used to identify the receiving vehicle parameters in different ways. Sensors 170 and 172 can have signal processing systems that process the signals generated by RADAR and LIDAR sensors to identify the receiving vehicle parameters.

Unloading control system 150 controls the unloading process by which material conveyance subsystem 186 conveys material from leading vehicle 101 to receiving vehicle 134.

Vehicle position detection system 164 detects the position of leading vehicle 101 and following vehicle 136 or receiving vehicle 134 either in terms of absolute coordinates within a global or local coordinate system, or in terms of a relative position in which the positions of vehicles 101 and 136 and/or 134 are determined relative to one another. For instance, by identifying the edges of receiving vehicle 134 in an image captured by camera 106, and by knowing the location and orientation of camera 106 on leading vehicle 101, the location of receiving vehicle 134 relative to leading vehicle 101 (and thus relative to material conveyance subsystem 186) is also known. In another example, vehicle position detection system 164 can receive an input from position sensor 146 on vehicle 101 and from position sensor 196 (which may also be a GNSS receiver, etc.) on following vehicle 136 (or the sensor 196 could be on receiving vehicle 134 as well) to determine where the two vehicles are located relative to one another. Vehicle position detection system 164 can then detect the location of receiving vehicle 134 relative to the material conveyance subsystem 186.

Control signal generator 166 generates control signals that can be used to control vehicle 101 and following vehicle 136 to accomplish the desired fill pattern. For instance, control signal generator 166 can generate control signals to control the material conveyance subsystem to start or stop material conveyance, to control the spout position or flap position in order to control the trajectory of material that is being conveyed to receiving vehicle 134, or to control the propulsion system 188 or steering subsystem 190. Control signal generator 166 can also generate control signals that are sent by communication system 148 to the following vehicle 136 to "nudge" the following vehicle 136 forward or rearward relative to leading vehicle 101, to instruct the operator 208 of following vehicle 136 to perform a desired operation, or to generate other control signals.

Material conveyance subsystem 186 may include one or more of an auger, cross auger(s), a blower, spout, flap, auger, etc., which control conveyance of harvested material from leading vehicle 101 to receiving vehicle 134, as well as the trajectory of such material. Propulsion subsystem 188 can be an engine that powers one or more different motors, electric motors, or other systems that provide propulsion to leading vehicle 101. Steering subsystem 190 can be used to control the heading and forward/backward directions of travel of leading vehicle 101.

Operator interface system 154 can generate interfaces for operator 194 and receive inputs from operator 194. Therefore, operator interface system 154 can include interface mechanisms such as a steering wheel, joysticks, pedals, buttons, displays, levers, linkages, etc. Operator interface system 154 can generate interfaces for interaction by operator 194, such as on a display screen, a touch sensitive displays screen, or in other ways. Operator interface system 154 outputs that interface on a display screen or in other ways and can detect operator interactions with the displayed interface, such as the operator actuating icons, links, buttons, etc. Operator 194 can interact with the interface using a point and click device, touch gestures, speech commands (where speech recognition and/or speech synthesis are provided), or in other ways.

Speed/velocity sensor 147 senses or determines the ground speed and/or heading of leading vehicle 101. The speed can be detected by detecting the speed of a motor, of an axle, or a transmission. Sensor 147 can also determine the speed and/or heading using inertial measurement units (IMUs), accelerometers, etc. Sensor 147 can also derive the speed and/or heading of vehicle based on other inputs, such as based on successive inputs from position sensor 146, or in other ways.

As mentioned above, position sensor 196 on following vehicle 136 may be a global navigation satellite system (GNSS) receiver, a dead reckoning system, a cellular triangulation system, or any of a wide variety of other systems that provide coordinates of following vehicle in a global or local coordinate system, or that provide an output indicating the position of following vehicle 136 relative to a reference point (such as relative to leading vehicle 101), etc. Communication system 198 allows the communication of items on vehicle 136 with one another, and also provides for communication with leading vehicle 101, and/or other systems. Therefore, communication system 198 can be similar to communication system 148 discussed above, or different. It will be assumed for the purpose of the present discussion that communication systems 148 and 198 are similar, although this is for the sake of example only. Data store 200 can store dimension data which identify different dimensions of following vehicle 136, the location and/or orientation of different sensors on vehicle 136, kinematic information describing vehicle 134 and/or vehicle 136, and other information. Control system 202 can be used to receive inputs and generate control signals. The control signals can be used to control communication system 198, an operator interface system, data store 200, the propulsion and/or steering subsystem on following vehicle 136, and/or other items. The operator interface system can also include operator interface mechanisms, such as a steering wheel, joysticks, buttons, levers, pedals, linkages, etc., and can also include a display screen that can be used to display operator interfaces for interaction by operator 208. Operator 208 can interact with the operator interfaces using a point and click device, touch gestures, voice commands, etc.

Speed/velocity sensor 204 can be similar to, or different from, speed/velocity sensor 147. The sensors 147 and 204 are assumed to be similar for the sake of example only.

Fill level detection system 162 detects a fill level of material in receiving vehicle 134. Fill level detection system 162 can obtain an input from optical sensor 169 to detect the fill level based on an image captured by camera 106. For instance, based on a captured image processed by image processor 171, fill level detection system 162 can determine the level of material in receiving vehicle 134 relative to the top edge of receiving vehicle 134, or relative to another part of receiving vehicle 134. Fill level detection system 162 may also detect the fill level of material in receiving vehicle 134 based on weight or based on volume or based on a combination of measures. For instance, receiving vehicle 134 may have a scale that measures the weight of material loaded at a particular landing point in receiving vehicle 134 and/or the weight of material, overall, loaded into receiving vehicle 134. Similarly, fill level detection system 162 may generate a fill level indicator that is based on a volume of material loaded into receiving vehicle 134. Fill strategy control system 161 can receive an input from fill level detection system 162 and receiving vehicle sensors 152 to generate an output to control signal generator 166 in order to execute a desired fill strategy. For instance, fill strategy control system 161 can identify a current landing point of material in receiving vehicle 134 and receive an input from fill level detection system 162 to determine whether the material level at the current landing point has reached a desired level so that a nudge should be provided or so that the landing point should be adjusted in another way. Based on the desired fill strategy, fill strategy control system 161 can generate an output signal so that control signal generator 166 generates control signals to change the landing point (e.g., the relative position of vehicles 134 and 101, the position of material conveyance subsystem 186, etc.) according to the desired fill strategy. Fill strategy control system 161 can generate an output indicating when the desired fill strategy has been completed. Based upon the fill level, the fill strategy status, etc., control signal generator 166 can generate control signals to control material conveyance subsystem 186 and/or following vehicle 136 to execute a fill strategy, such as a front-to-back fill strategy, a back-to-front fill strategy, a multi-pass fill strategy, etc.

Stop condition processing system 164 monitors signals that may be indicative of a condition under which material conveyance subsystem 186 should be stopped. For instance, fill strategy processor 210 detects when a fill strategy has been completed, and/or when a desired fill level has been reached. As but one example, the operator 208 or 194 may set a desired fill level in receiving vehicle 134 that is below the maximum allowable fill level. In that case, the fill strategy may be completed even though the level of material in receiving vehicle 134 is not at its maximum allowable level. Thus, fill strategy processor 210 can identify when the material is filled to a desired fill level (as opposed to the maximum allowable fill level), the material is filled according to a completed fill strategy, and the fill level is filled to the maximum allowable fill level, to determine when the receiving vehicle 134 has been filled as desired. Once fill strategy processor determines that receiving vehicle 134 has been filled as desired, then fill strategy processor generates an output indicating that the fill operation should be stopped. Control signal generator 166 generates control signals to stop material conveyance subsystem 186. In one example, where multiple subsystems are used (e.g., where multiple augers are used, such as cross-augers 133 and unloading auger 135), fill strategy processor 210 can generate an output indicating that those augers should be stopped sequentially. For instance, when the material in receiving vehicle 134 is within a threshold level of the desired level, then control signal generator 166 can generate a control signal to first stop the cross augers 133 and then wait for a time period, so that auger 135 can be run to unload spout 108 without overloading receiving vehicle 134, and then stop auger 135.

Spill condition processor 212 processes input signals to determine when a spill is imminent, and/or when a spill is actually occurring. For instance, spill condition processor 212 can receive an input indicating the location of the boundaries of receiving vehicle 134 as well as the location of the landing point of material conveyed by material conveyance subsystem 186. If the landing point is outside the boundaries of receiving vehicle 134, then spill condition processor 212 determines that a spill is occurring and generates an output to control signal generator 166 so that control signal generator 166 can generate control signals to stop material conveyance subsystem 186.

Spill condition processor 212 can also identify how close the landing point of material in receiving vehicle 134 is to an edge of the receiving vehicle 134 and monitor the velocities of receiving vehicle 134 and leading vehicle 101 relative to one another to see whether a spill is imminent. This is described in greater detail elsewhere herein, such as below with respect to FIG. 9. When a spill is imminent, spill condition processor 212 generates an output to control signal generator 166 so that control signal generator 166 can control material conveyance subsystem 186 to stop conveying material to receiving vehicle 134 to avoid or mitigate a spill.

Unloading condition processor 214 receives signals indicative of the level of material in the hopper or clean grain tank in leading vehicle 101 to determine whether the hopper or clean grain tank has been unloaded. In one example, the level of material in the hopper or clean grain tank can be directly detected by an optical detector, a radar detector, a scale, etc. In another example, the level of material can be detected by capturing an image of the column of material exiting spout 108 and processing that image to determine whether the clean grain tank or hopper has been unloaded. For instance, when the clean grain tank is full, the column may have a first size or characteristic that reflects a large amount of material. However, when the clean grain tank or hopper is unloaded, there may still be material coming out of the spout 108, because the material is still being harvested. However, the volume of material coming out of spout 108 may be much lower than when the clean grain tank is full. Thus, the size of the column of material exiting spout will change when the clean grain tank is unloaded. The characteristic of the column can be captured (such as by processing an image of the column) and classified (such as using a convolutional neural network) as indicating whether the clean grain tank is unloaded.

In another example, a torque sensor can be used to sense the torque on cross augers and/or unloading auger 135 or other mechanisms to indicate an amount of material being conveyed by the augers. The torque sensor signal can thus be processed to determine whether the clean grain tank is unloaded.

In yet another example, unloading condition processor 214 can receive a signal from a mass flow sensor indicating the mass flow of material that is exiting the clean grain tank or hopper of leading vehicle 101 (and possibly the mass flow of material entering the clean grain tank or hopper) and process those signals to determine whether the clean grain tank or hopper is unloaded. For instance, if the mass flow rate of material exiting spout 108 drops significantly or coincides with the mass flow rate of material entering the clean grain tank, this may indicate that the clean grain tank is unloaded.

Figure 5:
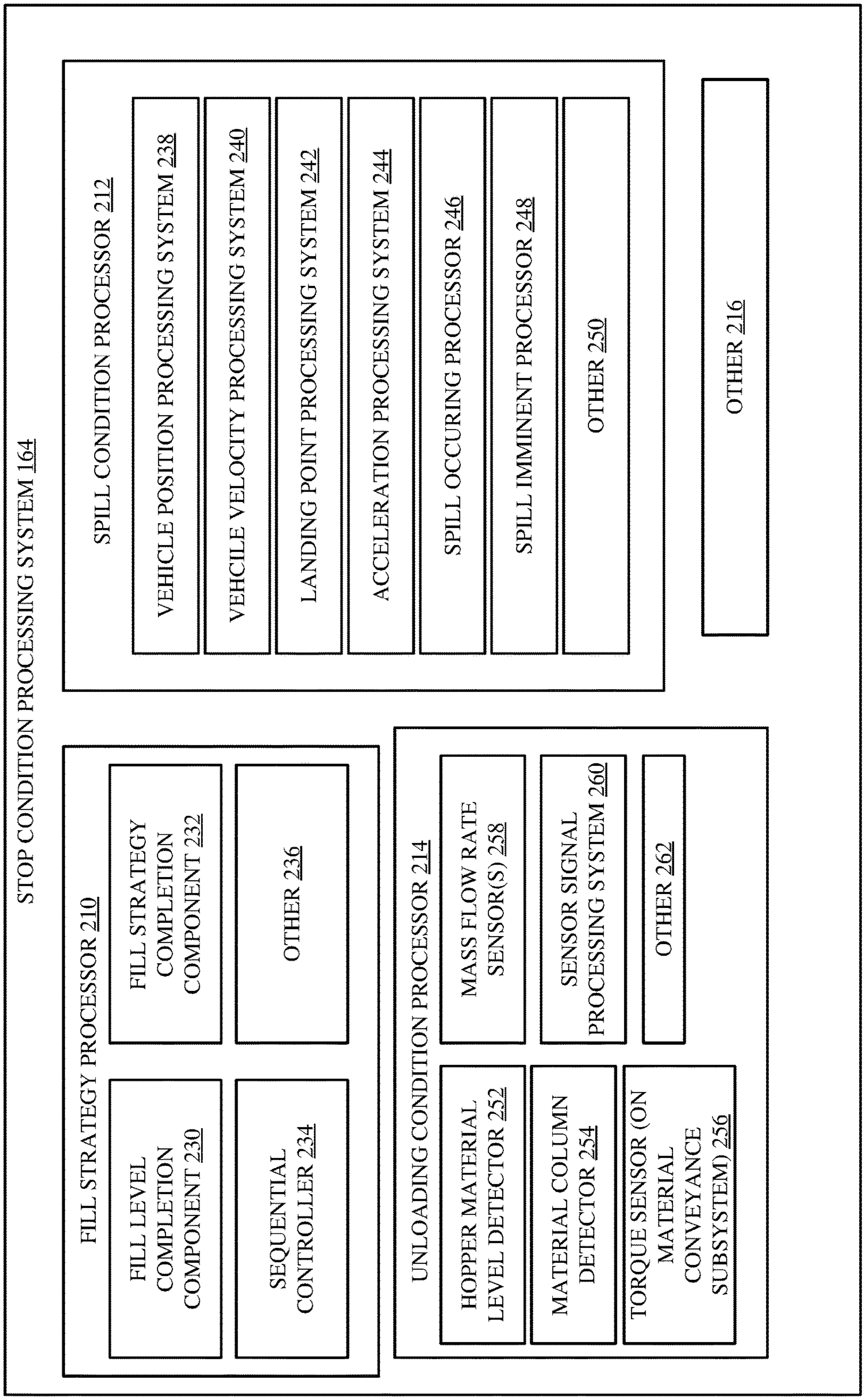
FIG. 5 is a block diagram of one example of a stop condition processing system.

FIG. 5 is a block diagram showing one example of stop condition processing system in more detail. FIG. 5 shows that, in one example, fill strategy processor 210 includes fill level completion component 230, fill strategy completion component 232, sequential controller 234, and other items 236. Spill condition processor 212 includes vehicle position processing system 238, vehicle velocity processing system 240, landing point processing system 242, acceleration processing system 244, spill occurring processor 246, spill imminent processor 248, and other items 250. Unloading condition processor 214 includes hopper material level detector 252, material column detector 254, torque sensor 256 (which may be deployed on a portion of the material conveyance subsystem 186 or elsewhere) mass flow rate sensor 258, sensor signal processing system 260, and other items 262. Before describing the operation of stop condition processing system 164 in more detail, a description of some of the items in system 164, and their operation, are first provided.

Fill level completion component 230 receives an input from fill level detection system 162 and determines whether the material in receiving vehicle 134 has been filled to a desired fill level. For instance, fill level completion component 230 can compare the fill level of the material output by fill level detection system 162 to a desired fill level (which may be set by an operator or in another way) to determine whether the detected fill level meets the desired fill level. If so, component 230 can generate an output signal indicating that the material conveyance subsystem 186 should be stopped. Fill strategy completion component 232 can receive an input from fill strategy control system 161 indicating that a desired fill strategy has been completed.

In one example, components 230 and 232 generate preliminary output signals indicating that the fill level or the desired fill strategy are about to be completed. In that case, sequential controller 234 can generate an output indicating that the material conveyance subsystem should be controlled in a desired way. For instance, where material conveyance subsystem includes cross augers 133 and unloading auger 135, sequential controller 234 can generate an output to control signal generator 166 indicating that cross augers 133 should be stopped first, while unloading auger 135 is allowed to run to empty spout 108.

Spill condition processor 212 generates an output indicating whether a spill is occurring or whether a spill is imminent. Vehicle position processing system 238 obtains a signal indicative of the position or location of the boundaries of receiving vehicle 134. For instance, vehicle position processing system 238 may receive a signal (through communication system 148) from position sensor 196 which indicates the position of following vehicle 136. System 238 can then derive the position of receiving vehicle 134 and estimate the location of the boundaries of receiving vehicle 134. Vehicle position processing system 238 can receive an input from receiving vehicle sensors 152 to identify the position of receiving vehicle 134 and its boundaries relative to leading vehicle 101. Vehicle position processing system 238 can also receive an input from vehicle position detection system 160 which may indicate the relative positions of vehicles 101 and 134 relative to one another and the boundaries of receiving vehicle 134. Landing point processing system 242 receives an input indicative of the landing point of the material. Spill occurring processor 246 then compares the location of receiving vehicle 134 with the location of the boundaries of the landing point of the material. If the landing point of the material is not within the boundaries of receiving vehicle 134, then spill occurring processor 246 generates an output indicating that a spill is occurring.

Vehicle velocity processing system 240 receives an indication of the relative velocity of vehicles 101 and 134, or the absolute velocities of those vehicles when can then be compared to determine the relative velocities. Acceleration processing system 244 can receive an input from system 240 indicating the relative velocities of the two vehicles, and an input from landing point processing system 242 indicating how close the landing point of material in vehicle is to the edges of vehicle 134. Acceleration processing system 244 can then determine whether the relative velocity of the two vehicles can be adjusted to avoid a spill. By way of example, assume that leading vehicle 101 suddenly accelerates or suddenly stops. In that case, the relative velocity of vehicles 101 and 134 will change quickly. This change will be detected by vehicle velocity processing system 240 and output to acceleration processing system 244. Landing point processing system 242 also provides an output indicating where the landing point is in receiving vehicle 134. Acceleration processing system 244 then generates an output indicating whether the following vehicle 136 can accelerate or decelerate quickly enough to avoid a spill (based upon the difference in velocity between the two vehicles and based upon how close the landing point of the material is to one of the edges of receiving vehicle 134). Spill imminent processor 248 generates an output indicating whether a spill is imminent (in cases, for example, where following vehicle 136 is not able to react quickly enough to the change in velocity of leading vehicle 101). In one example, acceleration processing system 244 may be a machine learned model that considers the mass of following vehicle 136 and receiving vehicle 134, the power available to accelerate or decelerate vehicle 136 (e.g., the engine power, the machine torque, etc.) the relative velocities of the two vehicles, among other things, and generates an output indicative of whether following vehicle 136 is capable of responding quickly enough to avoid a spill.

Spill imminent processor 248 may also be a less complicated component where the difference in velocities of the two vehicles and the landing point of the material may be used to generate an output indicating whether a spill is imminent, regardless of the weight of the vehicles, the weight of the material in receiving vehicle 134, the available engine torque or engine power, etc. For instance, given the difference in velocities and the location of the landing point, processor may index into a lookup table to determine whether a spill is imminent. This is just one example.

Unloading condition processor 214 determines whether the hopper or clean grain tank on leading vehicle 101 is unloaded. Processor 214 can do this by using one or more of a variety of different detectors. For instance, hopper material level detector 252 can be a scale, a radar sensor, or another detector that detects whether the clean grain tank or hopper on leading vehicle 101 is unloaded. Material column detector 254 may be an optical detector or another detector that detects a characteristic of the column of material exiting the material conveyance subsystem 186 (e.g., exiting spout 108). The characteristic may be the size of the column, an estimated volume of the column of material, or another characteristic. Torque sensor 256 can sense the torque being applied by an unloading auger, a cross auger, or another conveyance mechanism to determine whether the torque has changed (indicating that the hopper or receiving vehicle is unloaded). Mass flow rate sensor 258 detects the mass flow rate of material through material conveyance subsystem 186 (e.g., through spout 108). Mass flow rate sensor 258 may also detect the mass flow rate of material into the clean grain tank or hopper.

Sensor signal processing system 260 receives the input from one or more sensors or detectors 252, 254, 256, and/or 258 and processes those sensor signals to determine whether the hopper or clean grain tank on leading vehicle 101 is unloaded. For instance, when the level of material in the clean grain tank or hopper drops below a desired level, as indicated by hopper material level detector 252, then system 260 may generate an output indicating that the hopper or clean grain tank is unloaded. When the torque sensed by torque sensor 256 decreases to a threshold level, this may also indicate that the hopper or clean grain tank is unloaded. When the characteristic of the material column detected by detector 254 changes sufficiently (e.g., when the size of the column decreases sufficiently), this may also indicate that the hopper or clean grain tank is unloaded. Further, when the mass flow rate sensed by mass flow rate sensor 258 decreases sufficiently, this may indicate that the hopper or clean grain tank is unloaded. Sensor signal processing system 260 may be an artificial intelligence or other machine learning classifier that receives the input signal from the detector or sensor and generates an output indicative of whether the hopper or clean grain tank is unloaded. In another example, sensor signal processing system may be a processor that compares the signals received to a threshold level signal or another value to generate an output, based upon that comparison, indicating whether the hopper or clean tank is unloaded. These are examples only.

Figure 6:
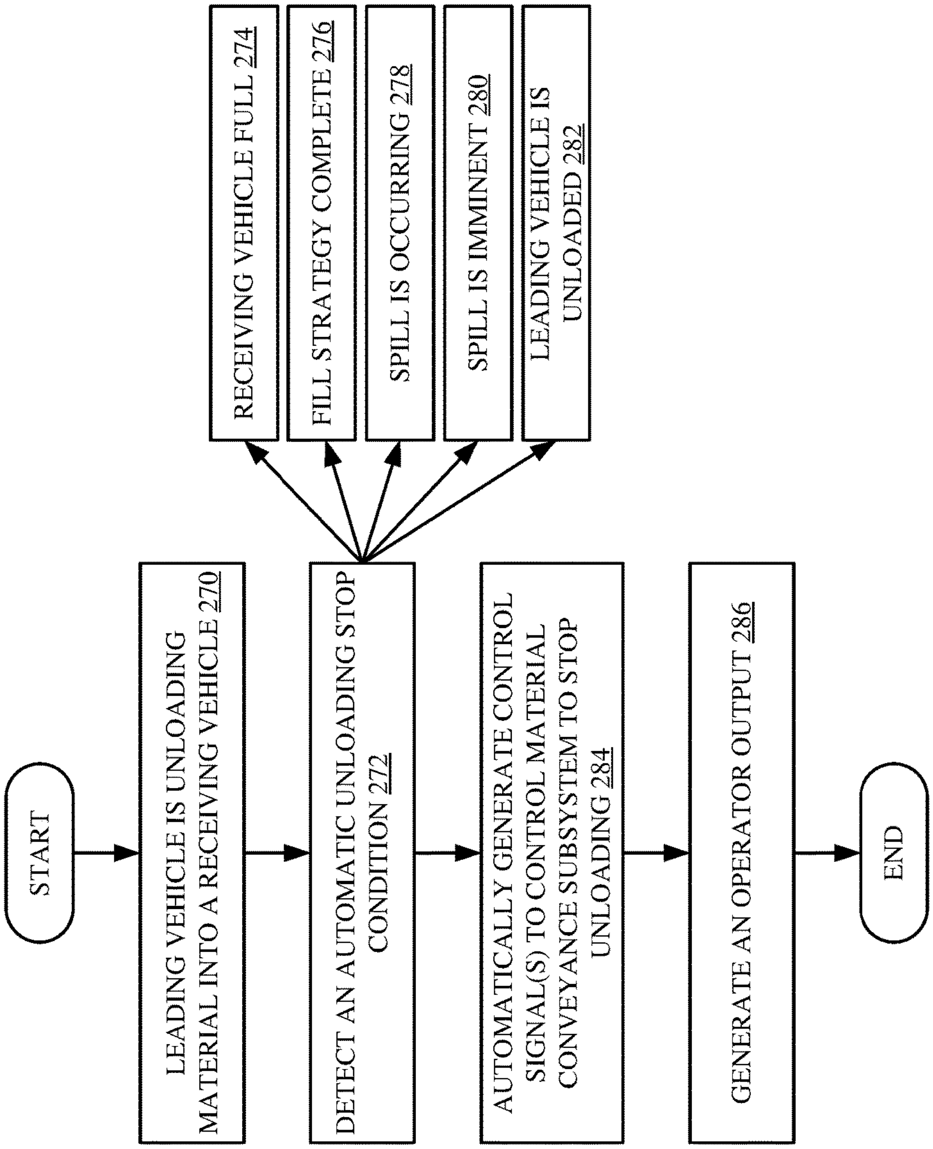
FIG. 6 is a flow diagram illustrating one example of the operation of the stop condition processing system.

FIG. 6 is a flow diagram illustrating one example of the operation of system 140 in automatically stopping the material conveyance subsystem 186. It is first assumed that leading vehicle 101 is unloading material into a receiving vehicle 134, as indicated by block 270 in the flow diagram of FIG. 6. Stop condition processing system 164 then detects an automatic unloading stop condition, as indicated by block 272. For instance, the stop condition can indicate that the receiving vehicle 134 is full (e.g., filled to a desired fill level) as indicated by block 274 or that the fill strategy for vehicle 134 has been completed, as indicated by block 276. The stop condition can be that a spill is occurring, as indicated by block 278 or that a spill is imminent, as indicated by block 280. The stop condition can include that the leading vehicle (e.g., the bin or hopper on leading vehicle 101) is unloaded, as indicated by block 282. Stop condition processing system 164 then generates an output to control signal generator 166 so that control signal generator 166 automatically generates control signals to control material conveyance subsystem 186 to stop unloading material into receiving vehicle 134. Automatically generating such signals is indicated by block 284 in the flow diagram of FIG. 6. Operator interface system 154 can also generate an output to operator 194. Further, an output can be generated to operator 208. Generating an operator output is indicated by block 286. The output may indicate that unloading has been stopped and/or the stop condition that was detected.

Figure 7:
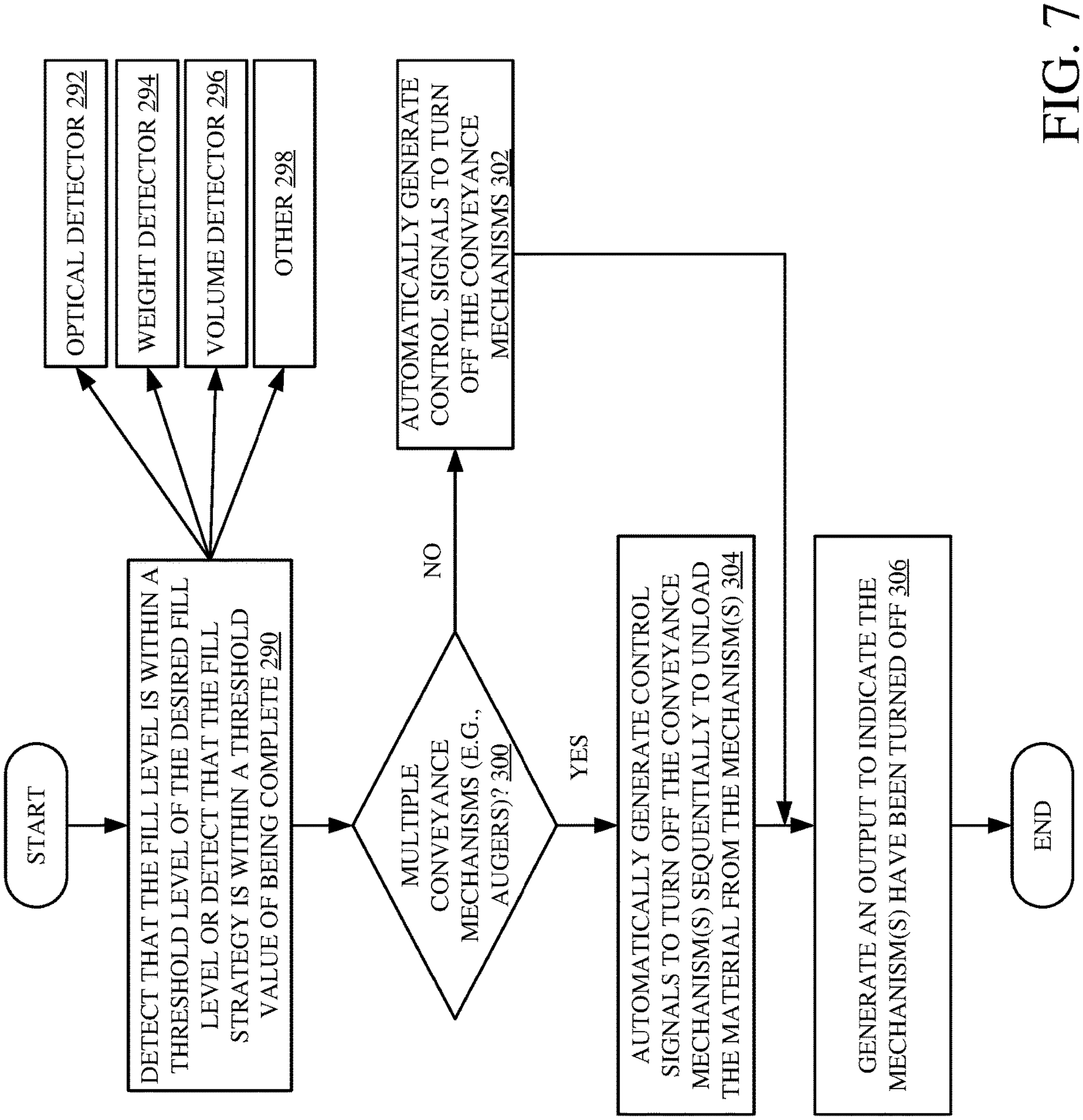
FIG. 7 is a flow diagram illustrating one example of the operation of a fill strategy processor.

FIG. 7 is a flow diagram illustrating one example of the operation of fill strategy processor 210 in generating an output indicating that a stop condition is present when either receiving vehicle 134 has been filled to a desired level or when a fill strategy has been completed. In one example, fill level completion component 230 detects that the fill level of material in receiving vehicle 134 is within a threshold level of a desired fill level. In another example, fill strategy completion component 234 detects that the fill strategy is within a desired value (e.g., a desired time, etc.) of being complete. Detecting that the level of material in receiving vehicle 134 is within a threshold of a desired level or detecting that the fill strategy is within a threshold value of being complete is indicated by block 290 in the flow diagram of FIG. 7. The fill level or fill strategy can be detected using one or more optical detectors 292, using a weight detector 294, a volume detector 296, an output from fill strategy control system 161, or in other ways 298.

Sequential controller 234 can determine whether there are multiple conveyance mechanisms (such as multiple augers, etc.) that are used to convey the material from leading vehicle 101 to receiving vehicle 134. If not, then fill strategy processor 210 automatically generates an output to control signal generator 166 so that control signal generator 166 generates control signals to turn off the conveyance mechanism. Determining whether there are multiple conveyance mechanisms is indicated by block 300, and automatically generating control signals to turn off a single conveyance mechanism is indicated by block 302.

If, at block 300, sequential controller 234 determines that there are a plurality of conveyance mechanisms (such as a plurality of augers, etc.) then sequential controller 234 generates an output to control signal generator 166 so that control signal generator 166 automatically generates control signals to turn off the conveyance mechanisms sequentially (or in another desired order), so that the material is unloaded from the conveyance mechanisms, as desired. For instance, where the material conveyance subsystem 188 includes cross augers 133 and unloading auger 135, then control signal generator 166 generates control signals to automatically turn off the cross augers 133 first and allow unloading auger 135 to run for a desired time period to unload material from spout 108. Automatically generating control signals to turn off the conveyance mechanisms sequentially is indicated by block 304 in the flow diagram of FIG. 7. An output can then be generated to indicate that the conveyance mechanisms have been turned off, as indicated by block 306.

Figure 8:
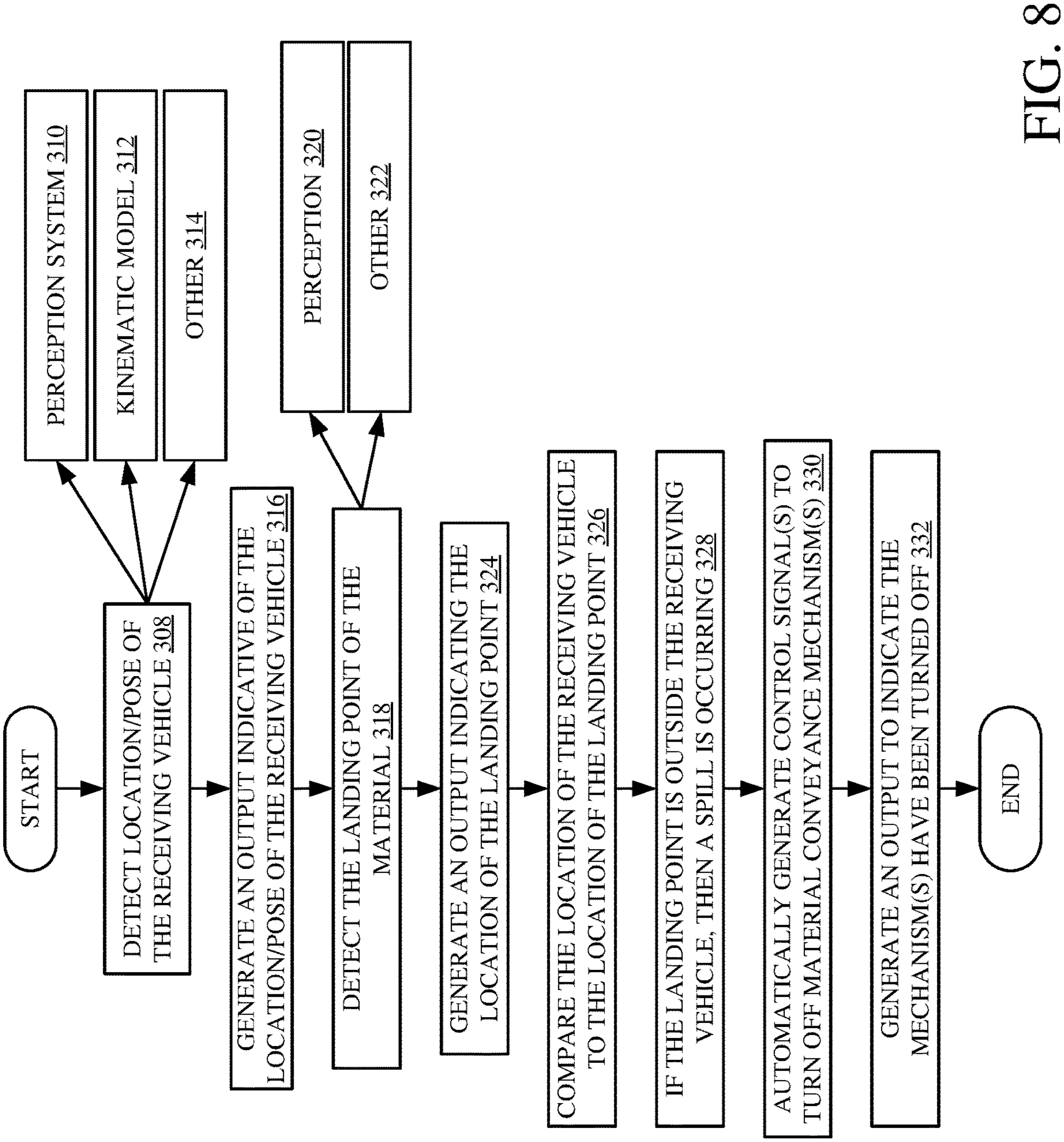
FIG. 8 is a flow diagram illustrating one example of the operation of a spill condition processor.

FIG. 8 is a flow diagram illustrating one example of the operation of spill condition processor 212 in identifying that a spill is occurring. In the example shown in FIG. 8, vehicle position processing system 238 first detects the location of the boundaries of receiving vehicle 134, as indicated by block 308. The detection of the boundaries of the receiving vehicle 134 can be performed using a perception system 310, a kinematic model 312, or a variety of sensors or detectors or systems 314. System 238 generates an output indicative of the location or pose of the boundaries of the receiving vehicle 134, as indicated by block 316.

Landing point processing system 242 then detects the location of the landing point of the material, as indicated by block 318. The landing point of the material can also be detected using a perception system 320, or any of wide variety of other systems 322. Landing point processing system 242 generates an output indicating the location of the landing point, as indicated by block 324.

Spill occurring processor 246 compares the location of the boundaries of the receiving vehicle 134 to the location of the landing point of material, as indicated by block 326. If the landing point is outside the boundary of the receiving vehicle 134, then spill occurring processor 246 generates an output indicating that a spill is occurring, as indicated by block 328. Control signal generator 166 then automatically generates control signals to turn off the material conveyance mechanisms, as indicated by block 330. An output can be generated to indicate that the material conveyance mechanisms have been turned off, the reason that they were turned off, etc., as indicated by block 332.

Figure 9:
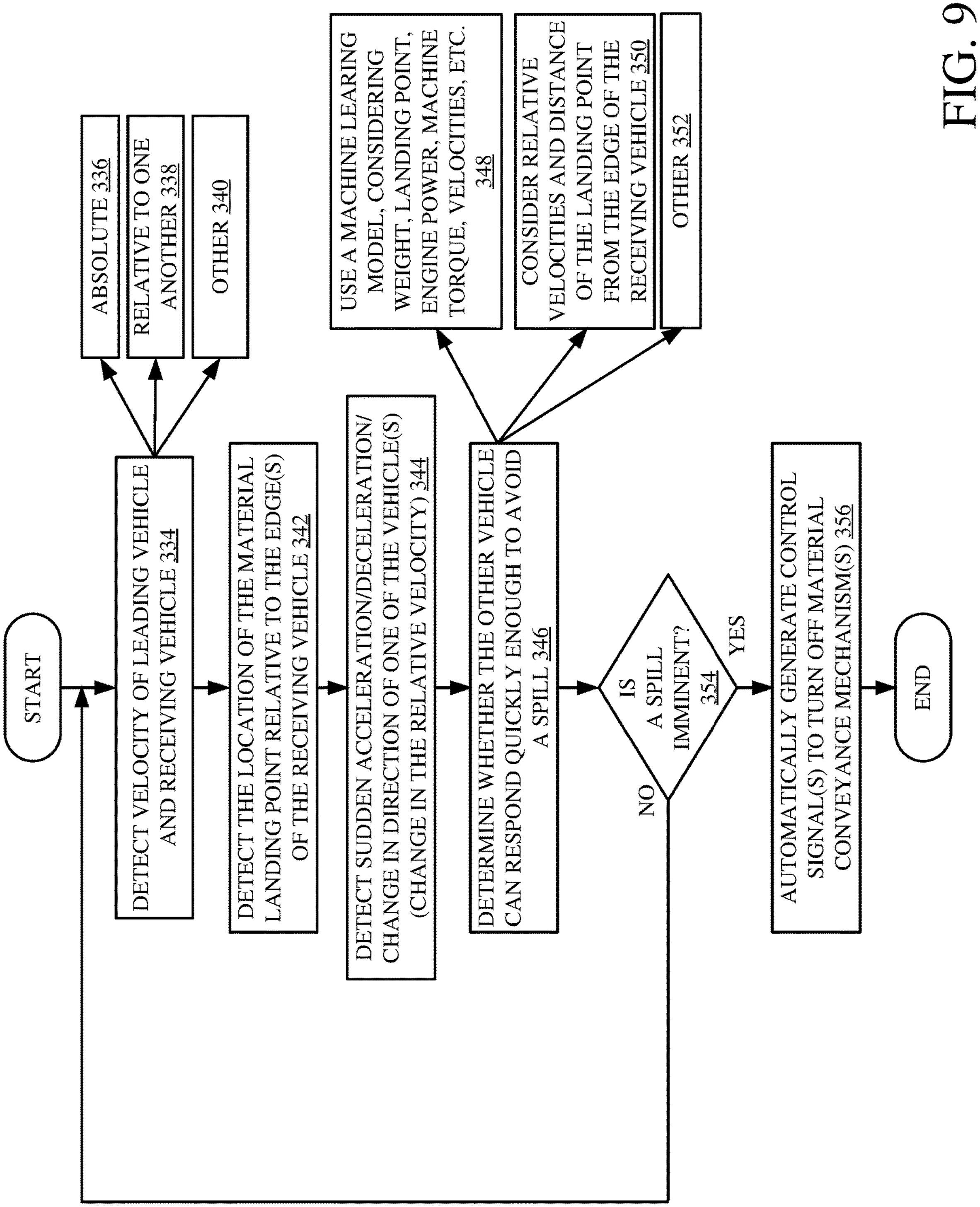
FIG. 9 is a flow diagram showing another example of the operation of a spill condition processor.

FIG. 9 is a flow diagram illustrating one example of the operation of spill condition processor 212 in determining that a spill is imminent. It is first assumed that the velocity of the leading vehicle 101 and receiving vehicle 134 are detected or otherwise obtained, as indicated by block 334 in the flow diagram of FIG. 9. Vehicle velocity processing system 240 can detect the absolute velocity of the vehicles as indicated by block 336, or the relative velocity of the vehicles, relative to one another, as indicated by block 338, or in other ways 340. Landing point processing system 242 also detects the location of the material landing point in vehicle 134 relative to the edges of the receiving vehicle 134, as indicated by block 342.

Acceleration processing system 244 can detect a sudden acceleration or deceleration of the vehicles relative to one another (e.g., based upon a change in velocity provided by vehicle velocity processing system 240) as indicated by block 344 in the flow diagram of FIG. 9. For purposes of the present discussion, it is assumed that leading vehicle 101 suddenly changed its velocity such as by accelerating, decelerating, stopping, changing its heading, etc. A sudden change in velocity (e.g., a sudden acceleration or deceleration or change in direction) may be defined in terms of the difference in the original and subsequent velocities, the magnitude of the difference in the relative velocities of the vehicles, or in other ways. Spill imminent processor 248 determines whether the other vehicle (e.g., the following vehicle 136) can respond quickly enough to the sudden acceleration or deceleration or change in direction, in order to avoid a spill. This determination is indicated by block 346 in the flow diagram of FIG. 9.

The determination can be made by applying the change in velocity and other characteristics (the weight of the machines, the engine power, the machine torque, the landing point of the material relative to the boundaries of the receiving vehicle, among other things) to a model. The model may be a machine learned model, a convolutional or other artificial neural network, or another type of classifier or model that takes the inputs and generates an output indicative of whether a spill can be avoided. This type of model is indicated by block 348 in the flow diagram of FIG. 9. In another example, spill imminent processor 248 can simply identify the difference in the velocities of the two machines and the landing point of material within receiving vehicle 134 relative to the boundaries of receiving vehicle 134, and generate an output indicating whether a spill is imminent. Considering the relative velocities and the distance of the landing point from the edge of the receiving vehicle 134 is indicated by block 350 in the flow diagram of FIG. 9. Spill imminent processor 248 can determine whether the vehicles can respond quickly enough to avoid a spill in other ways as well, as indicated by block 352. If spill imminent processor determines that a spill is not imminent (e.g., that the following vehicle 136 can respond quickly enough to avoid the spill) then processing reverts back to block 334. If, at block 354, it is determined that a spill is imminent, then spill imminent processor 248 generates an output to control signal generator 166 so that control signal generator 166 can automatically generate control signals to turn off the material conveyance mechanisms, in material conveyance subsystem 186, as indicated by block 356.

Figure 10:
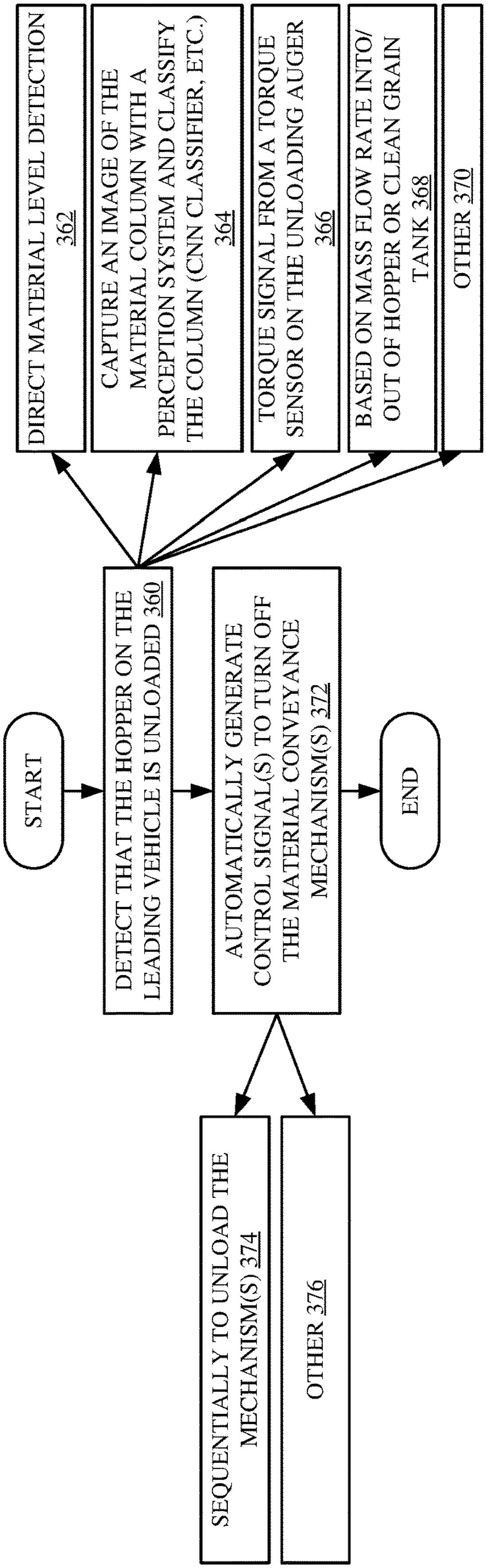
FIG. 10 is a flow diagram showing one example of the operation of an unloading condition processor.

FIG. 10 is a flow diagram illustrating one example of the operation of unloading condition processor 214 in determining whether the hopper or clean grain tank in leading vehicle is unloaded, and then generating an output to automatically control material conveyance subsystem 186. One of the detectors in unloading condition processor 214 first detects that the hopper or clean grain tank on the leading vehicle 101 is unloaded, as indicated by block 360 in the flow diagram of FIG. 10.

For instance, hopper material level detector 252 can directly detect the material level in the hopper or clean grain tank (such as using a radar sensor, a mechanical sensor, a scale, or an optical sensor, or any of a wide variety of other sensors that sense the material level in the hopper or clean grain tank), as indicated by block 362.

Material column detector 254 can capture a characteristic of the material column exiting spout 108, such as with a perception system, and classify the column to indicate whether the hopper or clean grain tank is unloaded. For instance, a characteristic of the column may be captured by capturing an image of the column and then using a convolutional neural network to classify that image to determine whether the column is indicative of an unloaded hopper or clean grain tank or a hopper or clean grain tank that still contains material to be unloaded. Capturing a characteristic of the material column is indicated by block 364 in the flow diagram of FIG. 10.

The detector can include a torque sensor 256 which generates a torque signal based on the torque being applied to the unloading mechanisms and indicating whether the volume of material being transferred by the material conveyance subsystem 186 is indicative of the hopper or clean grain tank being unloaded, as indicated by block 366 in the flow diagram of FIG. 10. Similarly, mass flow rate sensor 258 can sense the mass flow rate of material into and/or out of the hopper or clean grain tank to determine whether the hopper or clean grain tank is unloaded, as indicated by block 368 in the flow diagram of FIG. 10. Detecting that the hopper or clean grain tank on the leading vehicle is unloaded can be done in other ways, as indicated by block 370.

Sensor signal processing system 260 processes the signals to determine that the hopper or clean grain tank on the leading vehicle 101 is unloaded. Sensor signal processing system then generates an output to control signal generator 166 indicating that the hopper or clean grain tank is unloaded so that control signal generator 166 can automatically generate control signals to turn off the material conveyance mechanisms in the material conveyance subsystem 186, as indicated by block 372 in the flow diagram of FIG. 10.

In one example, where there are multiple augers or other conveyance mechanisms, those conveyance mechanisms can be controlled sequentially to ensure that any additional material in spout 108 or elsewhere is unloaded. Sequentially controlling the material conveyance mechanisms is indicated by block 374 in the flow diagram of FIG. 10. The control signals can be generated in other ways as well, as indicated by block 376.

It can thus be seen that the present description describes a system that detects stop conditions which indicate that an unloading operation should be automatically stopped. Those stop conditions can be automatically detected based upon the level of material in the receiving vehicle 134, the level of material in the clean grain tank or hopper of the leading vehicle 101, and whether a spill is occurring or whether a spill is imminent. This can enhance the accuracy of the unloading operation, resulting in fewer spills and more even material fill in the receiving vehicle 134.

Figure 11:
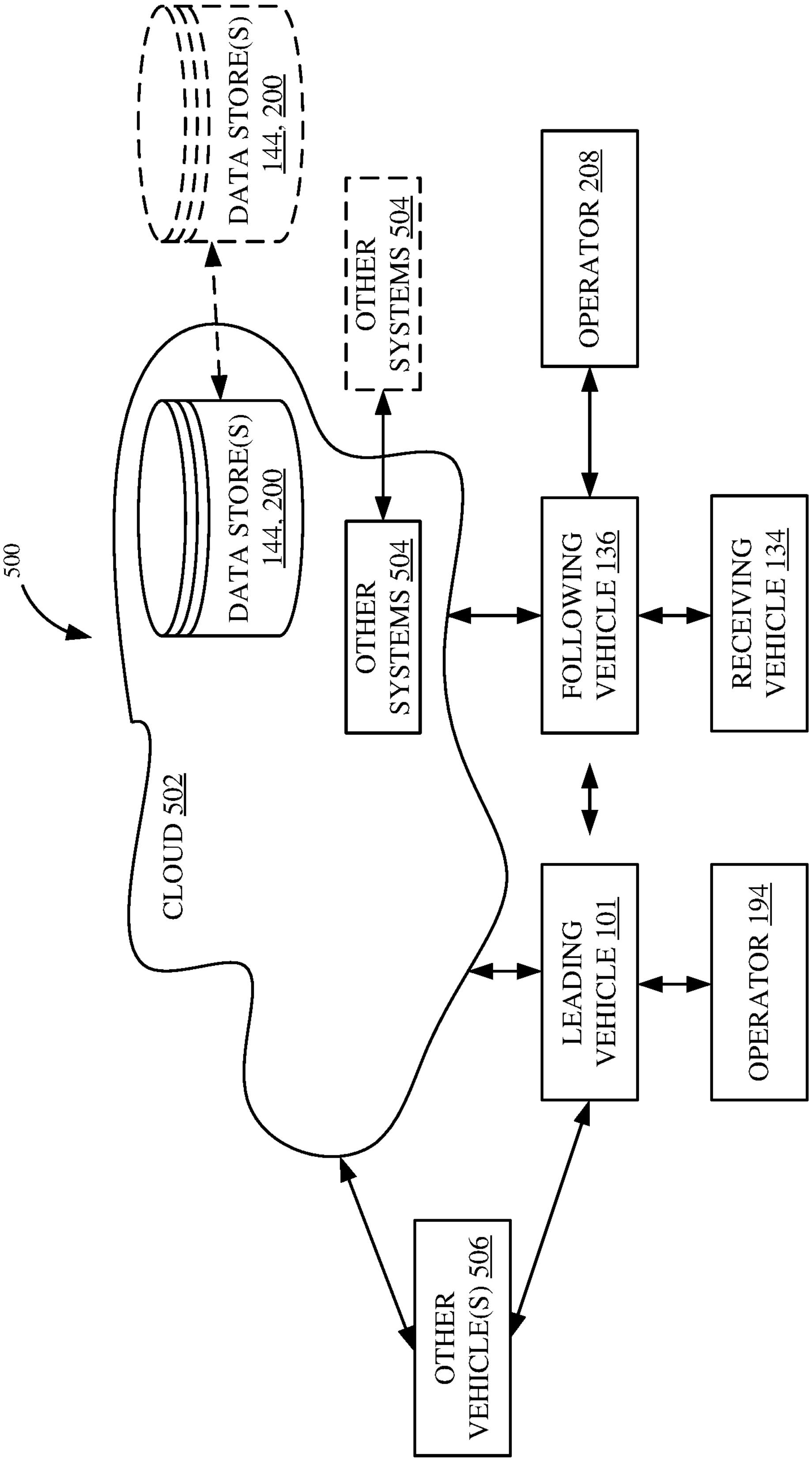
FIG. 11 is a block diagram showing one example of a harvesting machine deployed in a remote server architecture.

FIG. 11 is a block diagram illustrating agricultural system, shown in FIG. 4, except that the system is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or the components and functions can be installed on client devices directly, or in other ways.

In the example shown in FIG. 11, some items are similar to those shown in FIG. 4 and they are similarly numbered. FIG. 11 specifically shows that data stores 144, 200, and other systems 504, can be located at a remote server location 502. Therefore, vehicles 101, 136 can access those systems through remote server location 502.

FIG. 11 also depicts another example of a remote server architecture. FIG. 11 shows that it is also contemplated that some elements of FIG. 4 can be disposed at remote server location while others are not. By way of example, one or more of data stores 144, 200 and other systems 504, or other items can be disposed at a location separate from location 502, or disbursed among various locations, and accessed through the remote server at location 502. Regardless of where the items are located, the items can be accessed either directly by machine 101 and/or machine 136, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

FIG. 11 shows that other vehicles 506 can communicate with one or more vehicles 101, 136, or with remote server environment 502 to obtain the calibrated offset values and/or other information. It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
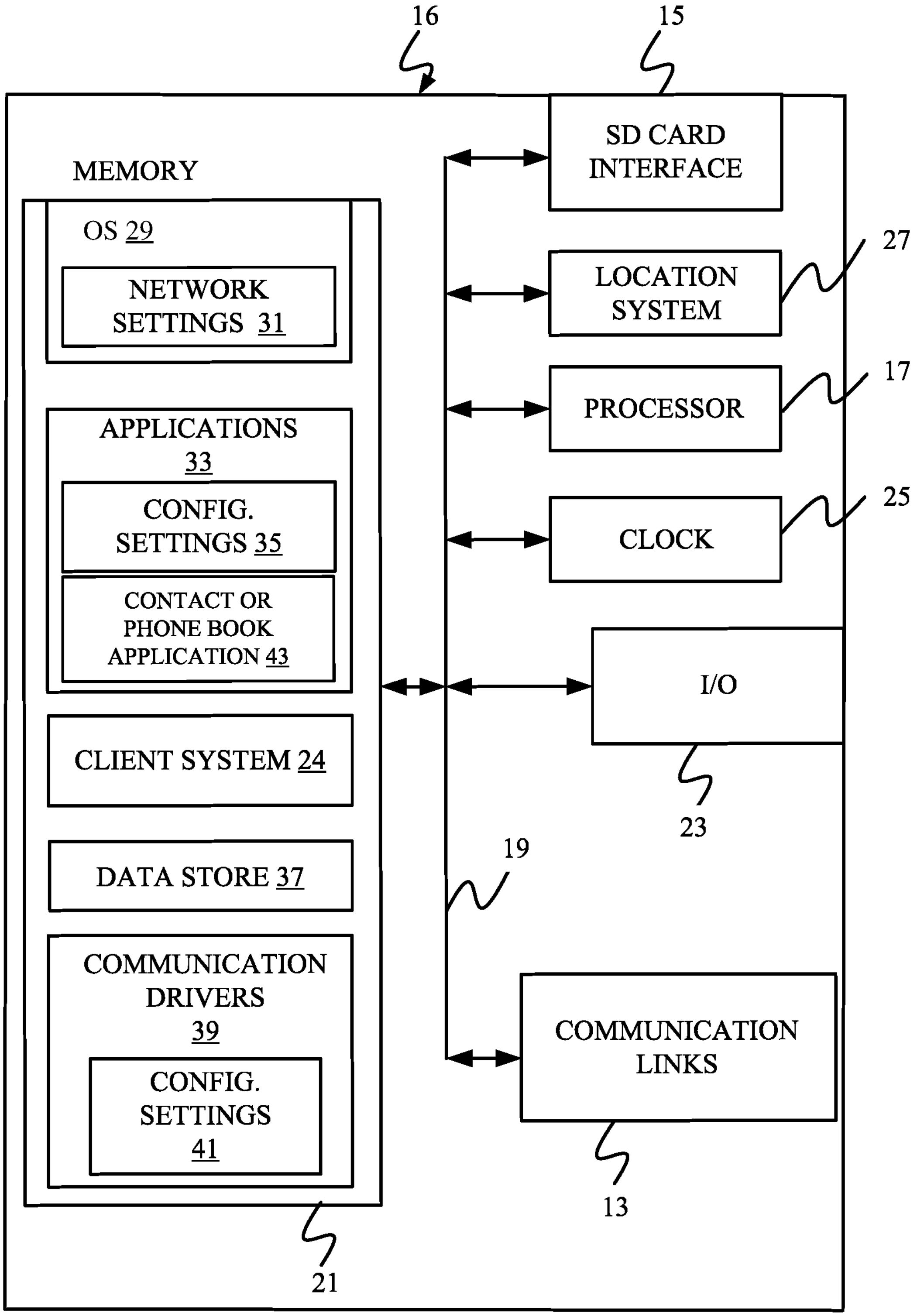
FIGS. 12-14 show examples of mobile devices that can be used in the machines and systems described in other figures.
Figure 13:
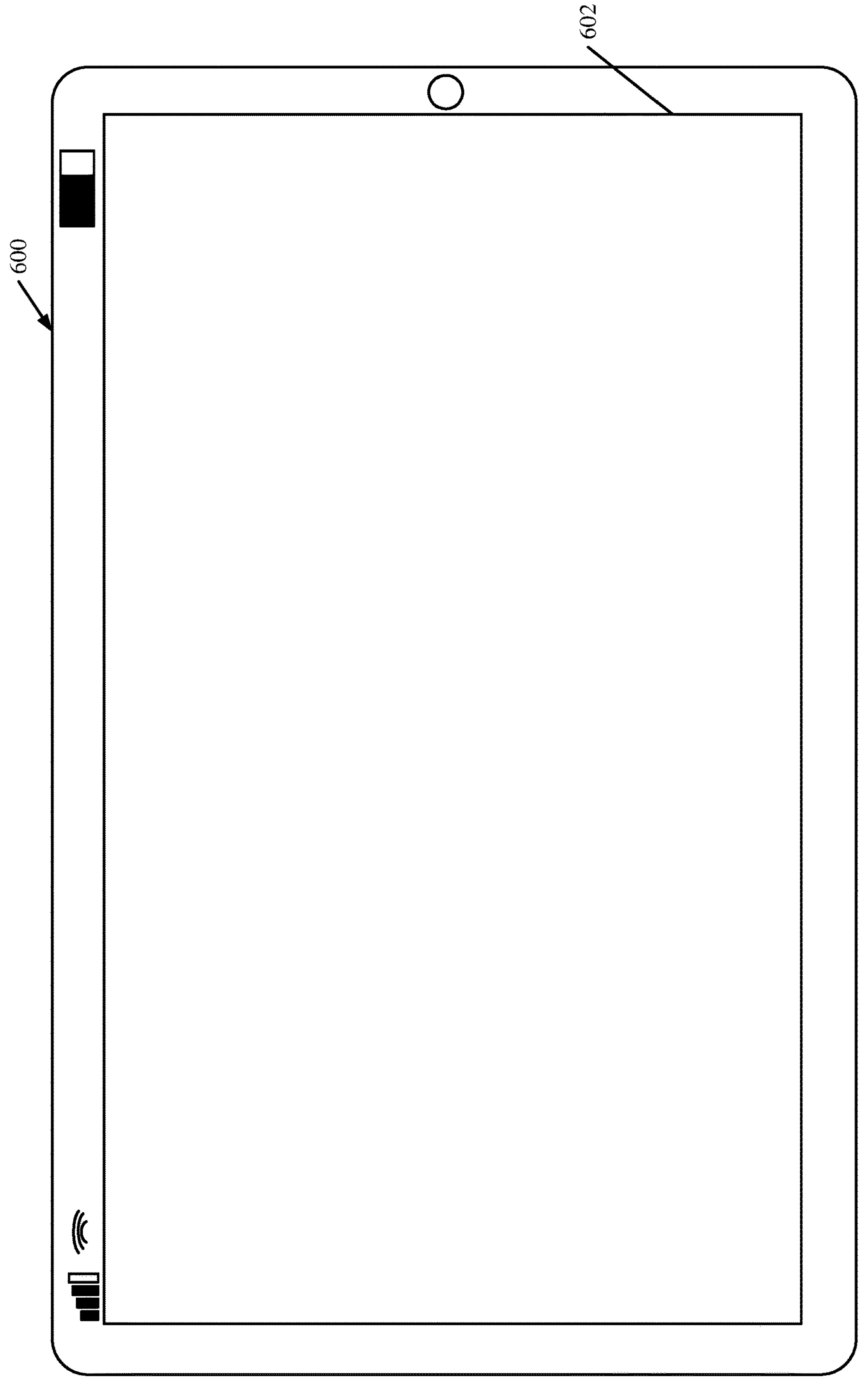
Figure 14:
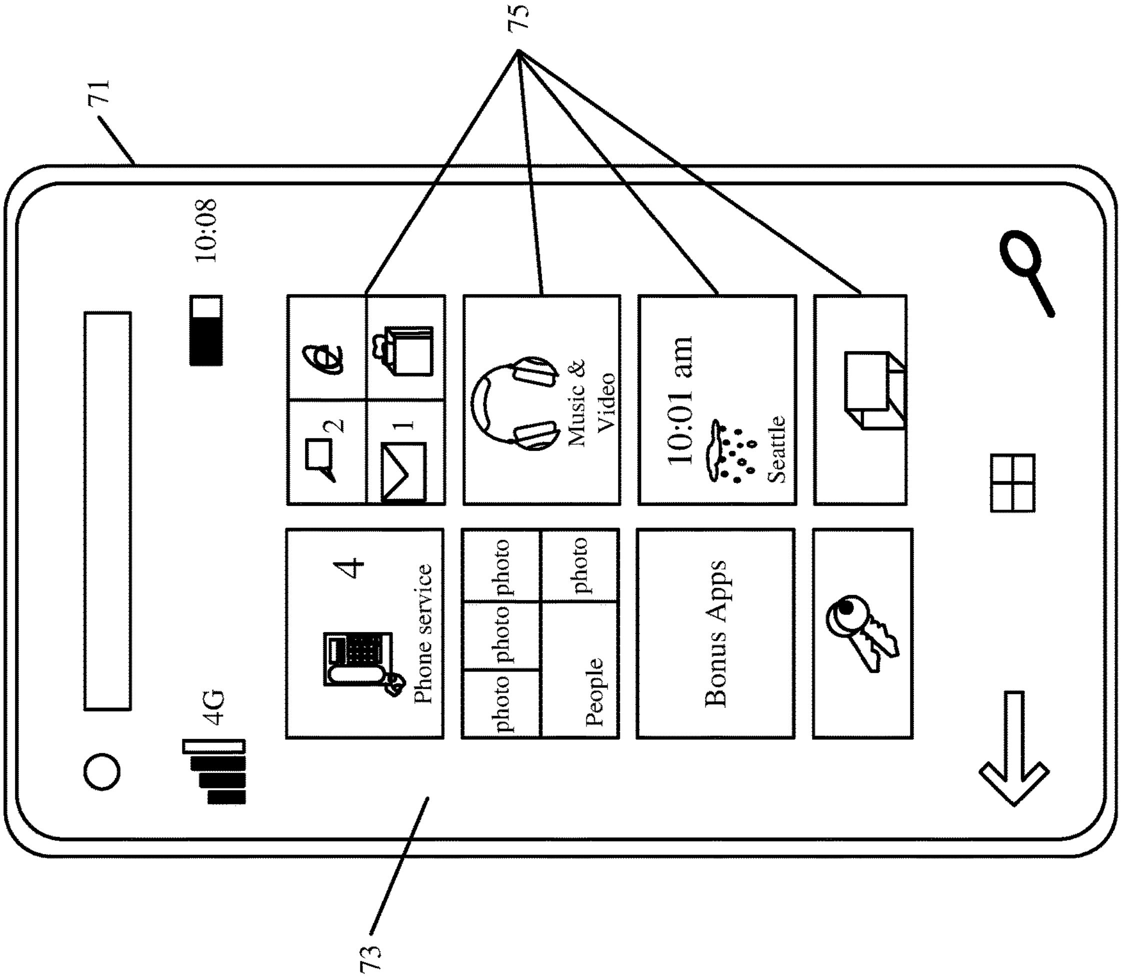

FIG. 12 is a simplified block diagram of one illustrative example of a handheld or mobile computing device that can be used as a user's or client's hand held device 16, in which the present system (or parts of it) can be deployed. For instance, a mobile device can be deployed in the operator compartment of one or both of vehicles 101, 136 for use in generating, processing, or displaying the calibrated offset values. FIGS. 13-14 are examples of handheld or mobile devices.

FIG. 12 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602. Screen 602 can be a touch screen or a pen-enabled interface that receives inputs from a pen or stylus. Tablet computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
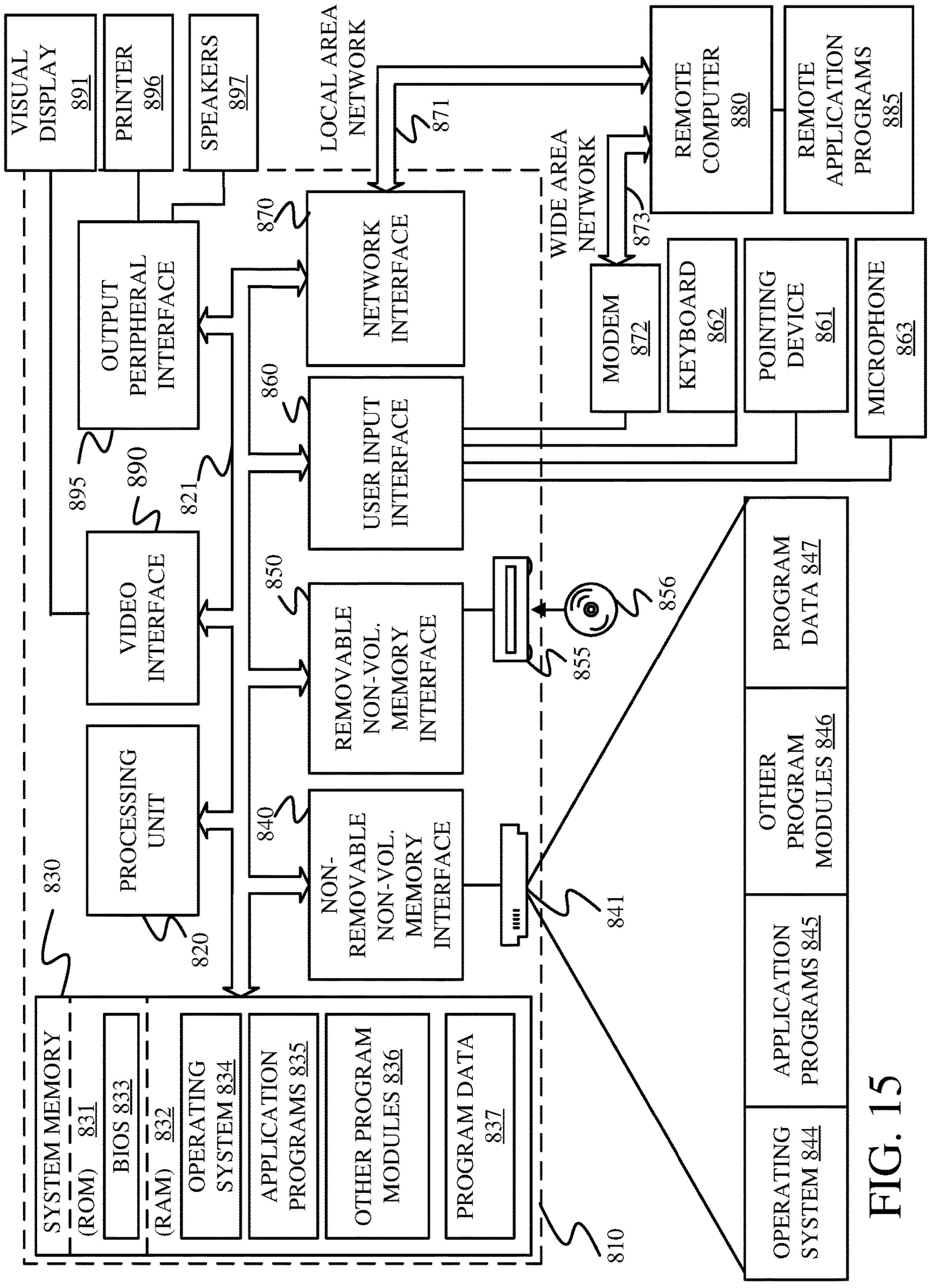
FIG. 15 is a block diagram showing one example of a computing environment that can be used in the machines and systems described with respect to previous figures.

FIG. 15 is one example of a computing environment in which elements of previous FIGS., or parts of them, (for example) can be deployed. With reference to FIG. 15, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material loading system, comprising:

a material conveyance subsystem configured to convey material from a hopper on a leading vehicle to a receiving vehicle;

a stop condition processing system configured to automatically detect a hopper condition characteristic indicative of an unloaded status of the hopper on the leading vehicle and to generate a stop signal based on the hopper condition characteristic indicating that the hopper is unloaded, wherein the hopper condition characteristic comprises at least one of:

a material column characteristic indicative of a column of material, exiting the material conveyance subsystem;

a mass flow change characteristic indicative of a change in mass flow of material through the material conveyance subsystem; or a torque characteristic indicative of a torque exerted by the material conveyance subsystem; and a control signal generator configured to automatically generate a control signal to stop the material conveyance subsystem from conveying the material from the hopper to the receiving vehicle based on the stop signal.

2. The material loading system of claim 1, and further comprising:

a fill level detection system configured to detect a fill level of the material in the receiving vehicle, wherein the stop condition processing system comprises:

a fill level completion component configured to generate the stop signal based on detecting that the fill level detected by the fill level detection system is within a threshold value of a desired fill level.

3. The material loading system of claim 1 wherein the material conveyance subsystem comprises a sequence of material conveyance mechanisms and wherein the stop condition processing system comprises:

a sequential controller configured to generate a sequence output to the control signal generator to stop the sequence of material conveyance mechanisms in a desired sequence.

4. The material loading system of claim 1 and further comprising:

a fill strategy control system configured to generate an output signal to control a landing point of the material in the receiving vehicle to fill the receiving vehicle according to a fill strategy and to generate a strategy complete signal indicating completion of the fill strategy.

5. The material loading system of claim 4 wherein the stop condition processing system comprises:

a fill strategy completion component configured to generate the stop signal based on the strategy complete signal.

6. The material loading system of claim 1 wherein the stop condition processing system comprises:

a vehicle position processor configured to identify a location of a boundary of the receiving vehicle;

a landing point processing system configured to generate an output indicative of a location of a landing point of the material; and a spill occurring processor configured to compare the location of the boundary of the receiving vehicle and the location of the landing point and generate the stop signal when the location of the landing point is outside the boundary of the receiving vehicle.

7. The material loading system of claim 1 wherein the stop condition processing system comprises:

an acceleration processing system configured to detect a difference in the velocity of the leading vehicle relative to the receiving vehicle;

a vehicle position processor configured to identify a location of a boundary of the receiving vehicle;

a landing point processing system configured to generate an output indicative of a location of a landing point of the material; and a spill imminent processor configured to detect that a spill is imminent and generate the stop signal based on the difference in the velocity and the location of the landing point relative to the boundary of the receiving vehicle.

8. The material loading system of claim 1 wherein the stop condition processing system comprises:

an unloading condition processor configured to detect the hopper condition characteristic indicative of the unloaded status of the hopper and to generate the stop signal based on the hopper condition characteristic indicating that the hopper is unloaded.

9. The material loading system of claim 8 wherein the unloading condition processor comprises:

a hopper material level detector configured to detect a level of the material in the hopper and provide, as the hopper condition characteristic, a material level signal indicative of the detected level of material in the hopper.

10. The material loading system of claim 8 wherein the hopper condition characteristic comprises the material column characteristic, the unloading condition processor comprises:

a material column detector configured to detect the column of material exiting the material conveyance subsystem and provide, as the hopper condition characteristic, a column characteristic signal indicative of the detected column of material.

11. The material loading system of claim 8 wherein the hopper condition characteristic comprises the mass flow change characteristic, and the unloading condition processor comprises:

a mass flow sensor configured to detect the change in mass flow of material through the material conveyance subsystem and provide, as the hopper condition characteristic, a mass flow signal indicative of the detected change in mass flow of material.

12. The material loading system of claim 8 wherein the hopper condition characteristic comprises the torque characteristic, and the unloading condition processor comprises:

a torque sensor configured to detect the torque exerted by the material conveyance subsystem and provide, as the hopper condition characteristic, a torque signal indicative of the detected torque.

13. A material loading system comprising:

a material conveyance subsystem configured to convey material from a hopper on a leading vehicle to a receiving vehicle;

a stop condition processing system configured to detect a stop condition and to generate a stop signal based on the stop condition, wherein the stop condition processing system comprises:

an acceleration processing system configured to detect a difference in the velocity of the leading vehicle relative to the receiving vehicle;

a vehicle position processor configured to identify a location of a boundary of the receiving vehicle;

a landing point processing system configured to generate an output indicative of a location of a landing point of the material; and a spill imminent processor configured to detect that a spill is imminent and generate the stop signal based on the difference in the velocity and the location of the landing point relative to the boundary of the receiving vehicle, wherein the spill imminent processor comprises:

a machine learning model configured to determine whether a propulsion vehicle providing propulsion to the receiving vehicle can respond to the difference in velocity to avoid a spill and, if not, generate the stop signal; and a control signal generator configured to automatically generate a control signal to stop the material conveyance subsystem from conveying the material from the hopper to the receiving vehicle based on the stop signal.

14. A computer implemented method of controlling an unloading operation in which a leading vehicle unloads material into a receiving vehicle, the computer implemented method comprising:

conveying material from a hopper on a leading vehicle to a receiving vehicle;

automatically detecting a spill condition, wherein the spill condition represents a material spill comprising spillage of the material, after unload from the leading vehicle, onto the ground;

automatically detecting that the material spill is imminent or that the material spill is occurring; and automatically generating a control signal to stop conveying the material from the hopper to the receiving vehicle based on the detecting that the material spill is imminent or that the material spill is occurring.

15. The computer implemented method of claim 14 and further comprising:

detecting that a fill level of the material in the receiving vehicle is within a threshold value of a desired fill level; and automatically generating the control signal to stop conveying the material from the hopper to the receiving vehicle based on the detecting that the fill level of the material in the receiving vehicle is within the threshold value.

16. The computer implemented method of claim 14 and further comprising:

detecting that a fill strategy used to fill the receiving vehicle is complete; and automatically generating the control signal to stop conveying the material from the hopper to the receiving vehicle based on the detecting that the fill strategy used to fill the receiving vehicle is complete.

17. The computer implemented method of claim 15, wherein automatically detecting the spill condition comprises:

identifying a location of a boundary of the receiving vehicle;

generating an output indicative of a location of a landing point of the material;

comparing the location of the boundary of the receiving vehicle and the location of the landing point; and generating the control signal when the location of the landing point is outside the boundary of the receiving vehicle.

18. A material loading system, comprising:

a material conveyance subsystem comprising a plurality of material conveyance mechanisms configured to convey material from a hopper on a leading vehicle to a receiving vehicle;

a stop condition processing system configured to:

automatically detect a stop condition; and generate a sequence output to stop the plurality of material conveyance mechanisms in a desired sequence based on the stop condition; and a control signal generator configured to automatically generate a control signal to stop the plurality of material conveyance mechanisms in the desired sequence based on the sequence output.

19. The material loading system of claim 18, wherein the leading vehicle comprises an agricultural harvesting machine.

* * * * *